US012003625B2

(12) United States Patent
Vacon et al.

(10) Patent No.: US 12,003,625 B2
(45) Date of Patent: *Jun. 4, 2024

(54) RECEIVER FOR VERIFICATION USING ENTANGLED PHOTONS

(71) Applicant: Qubit Moving and Storage, LLC, Franconia, NH (US)

(72) Inventors: Gary Vacon, East Falmouth, MA (US); Kristin A. Rauschenbach, Franconia, NH (US)

(73) Assignee: Qubit Moving and Storage, LLC, Franconia, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,636

(22) Filed: Feb. 26, 2023

(65) Prior Publication Data

US 2023/0216670 A1 Jul. 6, 2023

Related U.S. Application Data

(63) Continuation of application No. 17/852,758, filed on Jun. 29, 2022, now Pat. No. 11,616,644, which is a
(Continued)

(51) Int. Cl.
*H04L 9/08* (2006.01)
*G06N 10/40* (2022.01)
*H04L 9/32* (2006.01)

(52) U.S. Cl.
CPC ........... *H04L 9/0852* (2013.01); *G06N 10/40* (2022.01); *H04L 9/321* (2013.01)

(58) Field of Classification Search
CPC ................. G06F 1/32; G06F 1/12; G06F 9/44
See application file for complete search history.

(56) References Cited

U.S. PATENT DOCUMENTS

| 5,418,905 A | 5/1995 | Rarity et al. |
| 6,028,935 A | 2/2000 | Rarity et al. |

(Continued)

FOREIGN PATENT DOCUMENTS

| CN | 109415201 A | 3/2019 |
| CN | 109586907 A | 4/2019 |

(Continued)

OTHER PUBLICATIONS

Suprano et al., "Detection techniques for Orbital Angular Momentum states", JTh3A.59, CLEO 2021, 2 pages.
(Continued)

*Primary Examiner* — Keshab R Pandey
(74) *Attorney, Agent, or Firm* — Rauschenbach Patent Law Group, PLLC; Kurt Rauschenbach

(57) ABSTRACT

A method of generating a verification code includes measuring a time of arrival and a corresponding first or second state value of a plurality of first photons and a plurality of second photons, where respective ones of the plurality of first photons are entangled with respective ones of a plurality of second photons in a first basis, which is time, and entangled in a second basis. A first and a second ordered list of the measured times of arrival of the plurality of respective first and second photons is generated. Time-of-arrival matches between the first ordered list and the second ordered list are determined. First or second state values that correspond to the determined time-of-arrival matches between the first ordered list and the second ordered list are determined. A verification code using some of the determined first or second state values that correspond to the determined time-of-arrival matches is generated.

25 Claims, 10 Drawing Sheets

Related U.S. Application Data continuation-in-part of application No. 17/465,235, filed on Sep. 2, 2021, now Pat. No. 11,614,771.

(60) Provisional application No. 63/356,534, filed on Jun. 29, 2022, provisional application No. 63/218,433, filed on Jul. 5, 2021, provisional application No. 63/186,754, filed on May 10, 2021, provisional application No. 63/118,542, filed on Nov. 25, 2020.

(56) References Cited

U.S. PATENT DOCUMENTS

| | | |
|---|---|---|
| 6,609,139 B1 | 8/2003 | Dultz et al. |
| 7,028,275 B1 | 4/2006 | Chen et al. |
| 7,072,432 B2 | 7/2006 | Belcea |
| 7,242,774 B1 | 7/2007 | Elliott et al. |
| 7,286,444 B1 | 10/2007 | Bahder et al. |
| 7,581,100 B2 | 8/2009 | Mizrah |
| 7,684,015 B2 | 3/2010 | Shih |
| 7,812,303 B2 | 10/2010 | Meyers et al. |
| 7,847,234 B2 | 12/2010 | Meyers et al. |
| 8,053,715 B2 | 11/2011 | Meyers et al. |
| 8,242,428 B2 | 8/2012 | Meyers et al. |
| 8,269,978 B2 | 9/2012 | Capron et al. |
| 8,373,107 B2 | 2/2013 | Meyers et al. |
| 8,525,149 B2 | 9/2013 | Stevenson et al. |
| 8,611,535 B2 | 12/2013 | Brodsky et al. |
| 8,890,049 B2 | 11/2014 | Yuan et al. |
| 8,983,303 B2 | 3/2015 | Meyers et al. |
| 9,064,315 B2 | 6/2015 | Meyers et al. |
| 9,131,128 B2 | 9/2015 | Meyers et al. |
| 9,270,385 B2 | 2/2016 | Meyers et al. |
| 9,331,843 B2 | 5/2016 | Silverman et al. |
| 9,473,301 B2 | 10/2016 | Englund et al. |
| 9,727,959 B2 | 8/2017 | Meyers et al. |
| 9,934,469 B1 | 4/2018 | Jau et al. |
| 10,541,809 B2 | 1/2020 | Godfrey et al. |
| 10,564,933 B2 | 2/2020 | Nordholt et al. |
| 10,595,102 B2 | 3/2020 | Brodsky et al. |
| 10,790,913 B2 | 9/2020 | Henningsen et al. |
| 10,992,391 B1 | 4/2021 | Meyers et al. |
| 11,193,750 B1 | 12/2021 | Fertig et al. |
| 11,251,952 B2 | 2/2022 | Lamas-Linares et al. |
| 11,268,806 B2 | 3/2022 | Fertig et al. |
| 11,290,181 B1 | 3/2022 | Meyers et al. |
| 11,367,014 B2 | 4/2022 | Vacon et al. |
| 11,411,658 B1 | 8/2022 | Vacon et al. |
| 11,431,418 B2 | 8/2022 | Rauschenbach et al. |
| 11,507,874 B2 | 11/2022 | Vacon et al. |
| 11,610,147 B2 | 3/2023 | Vacon et al. |
| 11,614,771 B2 | 3/2023 | Vacon et al. |
| 11,616,644 B2 | 3/2023 | Vacon et al. |
| 11,728,902 B1 | 8/2023 | Meyers et al. |
| 11,829,847 B2 | 11/2023 | Vacon et al. |
| 2002/0191176 A1 | 12/2002 | Saleh et al. |
| 2004/0095582 A1 | 5/2004 | Holbrook |
| 2004/0208638 A1* | 10/2004 | Jansen ............... H04B 10/2513 398/183 |
| 2004/0258421 A1* | 12/2004 | Conti ............... H04L 9/0852 398/183 |
| 2005/0100351 A1 | 5/2005 | Yuan et al. |
| 2005/0135620 A1 | 6/2005 | Kastella et al. |
| 2005/0199812 A1 | 9/2005 | Shih |
| 2006/0115086 A1 | 6/2006 | Beausoleil et al. |
| 2007/0101410 A1 | 5/2007 | Harrison et al. |
| 2008/0059712 A1 | 3/2008 | Fedorova |
| 2008/0180222 A1 | 7/2008 | Hollister et al. |
| 2009/0147955 A1* | 6/2009 | Kim ............... H04L 9/0858 380/256 |
| 2009/0194702 A1 | 8/2009 | Meyers et al. |
| 2009/0290162 A1 | 11/2009 | Erkmen et al. |
| 2009/0316910 A1 | 12/2009 | Maeda et al. |
| 2012/0051755 A1 | 3/2012 | Arahira |
| 2012/0294625 A1 | 11/2012 | Dynes et al. |
| 2013/0176573 A1 | 7/2013 | Bovino |
| 2014/0112478 A1 | 4/2014 | Arahira |
| 2015/0055961 A1 | 2/2015 | Meyers et al. |
| 2016/0028544 A1 | 1/2016 | Hyde et al. |
| 2016/0041032 A1 | 2/2016 | Matthews et al. |
| 2016/0112066 A1 | 4/2016 | Ashikhmin |
| 2016/0164615 A1 | 6/2016 | Dailey et al. |
| 2016/0191173 A1 | 6/2016 | Malaney |
| 2016/0234017 A1* | 8/2016 | Englund ............... H04B 10/25 |
| 2017/0099139 A1* | 4/2017 | Han ............... H04L 9/0858 |
| 2017/0364796 A1 | 12/2017 | Wiebe et al. |
| 2018/0152295 A1 | 5/2018 | Drost et al. |
| 2018/0232649 A1 | 8/2018 | Wiebe et al. |
| 2018/0239592 A1 | 8/2018 | Nordholt et al. |
| 2019/0103962 A1 | 4/2019 | Howe et al. |
| 2019/0376820 A1 | 12/2019 | Jones et al. |
| 2020/0044749 A1 | 2/2020 | Rauschenbach et al. |
| 2020/0084033 A1 | 3/2020 | Lamas-Linares et al. |
| 2020/0183250 A1 | 6/2020 | Hall et al. |
| 2020/0233645 A1 | 7/2020 | Nordholt et al. |
| 2020/0274703 A1 | 8/2020 | Lukens et al. |
| 2020/0313879 A1 | 10/2020 | Hong et al. |
| 2020/0334101 A1 | 10/2020 | Albert et al. |
| 2020/0350990 A1 | 11/2020 | Beattie, Jr. et al. |
| 2020/0374211 A1 | 11/2020 | Griffin et al. |
| 2020/0379171 A1 | 12/2020 | Li et al. |
| 2020/0382219 A1 | 12/2020 | Innes et al. |
| 2021/0105135 A1 | 4/2021 | Figueroa et al. |
| 2021/0116639 A1 | 4/2021 | Fertig et al. |
| 2021/0124640 A1 | 4/2021 | Nickerson et al. |
| 2021/0132969 A1 | 5/2021 | Smith |
| 2021/0133614 A1 | 5/2021 | Ashrafi |
| 2021/0152346 A1 | 5/2021 | Bucklew et al. |
| 2021/0273731 A1 | 9/2021 | Zhang et al. |
| 2021/0295196 A1 | 9/2021 | Gimeno-Segovia |
| 2021/0296558 A1 | 9/2021 | Englund et al. |
| 2021/0325605 A1 | 10/2021 | Rudolph et al. |
| 2022/0019409 A1 | 1/2022 | Bharadwaj et al. |
| 2022/0043128 A1 | 2/2022 | Pacala et al. |
| 2022/0069152 A1 | 3/2022 | Tosi et al. |
| 2022/0084085 A1 | 3/2022 | Rigetti et al. |
| 2022/0085985 A1 | 3/2022 | Kaplan |
| 2022/0114471 A1 | 4/2022 | Vacon et al. |
| 2022/0214713 A1 | 7/2022 | Vacon et al. |
| 2022/0309375 A1 | 9/2022 | Vacon et al. |
| 2022/0353068 A1 | 11/2022 | Vacon et al. |
| 2023/0058994 A1 | 2/2023 | Vacon et al. |
| 2023/0177375 A1 | 6/2023 | Vacon et al. |
| 2023/0185330 A1 | 6/2023 | Vacon |
| 2023/0324527 A1 | 10/2023 | Vacon et al. |
| 2023/0327778 A1 | 10/2023 | Vacon et al. |
| 2023/0327779 A1 | 10/2023 | Vacon et al. |
| 2023/0336336 A1 | 10/2023 | Vacon et al. |
| 2023/0375327 A1 | 11/2023 | Vacon et al. |

FOREIGN PATENT DOCUMENTS

| | | |
|---|---|---|
| EP | 3771137 A1 | 1/2021 |
| JP | 6060737 B2 | 1/2017 |
| JP | 6708062 B2 | 6/2020 |
| KR | 10-2021-0154364 A | 12/2021 |
| WO | 2020/140850 A1 | 7/2020 |
| WO | 2020/180672 A1 | 9/2020 |
| WO | 2020/232546 A1 | 11/2020 |
| WO | 2021/013990 A1 | 1/2021 |
| WO | 2021/171248 A1 | 9/2021 |
| WO | 2021/262322 A1 | 12/2021 |
| WO | 2022/140011 A2 | 6/2022 |
| WO | 2022/159902 A1 | 7/2022 |
| WO | 2023/196749 A1 | 10/2023 |
| WO | 2023/224658 A2 | 11/2023 |
| WO | 2023/225456 A1 | 11/2023 |
| WO | 2024/006713 A1 | 1/2024 |

OTHER PUBLICATIONS

Placke et al., "Engineering AlGaAs-on-insulator towards quantum optical applications", JTu3A.20, CLEO 2021, 2 pages.

(56) References Cited

OTHER PUBLICATIONS

Kavuri et al., "Quantum state tomography at the Tsirelson bound", JTu3A.45, CLEO 2021, 2 pages.
Devetak et al., "Distillation of secret key and entanglement from quantum states", Proceedings of the Royal Society A, vol. 461, 2004, pp. 207-235.
Rangarajan et al., "Optimizing type-I polarization-entangled photons", Optics Express, vol. 17, No. 21, Oct. 12, 2009, pp. 18920-18933.
Strekalov et al., "Postselection-free energy-time entanglement", Physical Review A, Third Series, vol. 54, No. 1, Jul. 1996, pp. R1-R4.
Kaneda et al.,"Heralded single-photon source utilizing highly nondegenerate, spectrally factorable spontaneous parametric downconversion", Optics Express, vol. 24, No. 10, May 16, 2016, pp. 10733-10747.
Zielnicki, Kevin, "Pure Sources And Efficient Detectors For Optical Quantum Information Processing", 2014, 104 pages.
Lesovik et al., "Arrow of time and its reversal on the IBM quantum computer", Scientific Reports, 2019, vol. 9, No. 4396, 2019, 8 pages.
Ursin et al. "Entanglement-based quantum communication over 144 km", Nature Physics, vol. 3, Jul. 2007, pp. 481-486.
Giovannetti et al., "Quantum-enhanced positioning and clock synchronization", Nature, vol. 412, Jul. 26, 2001, 16 pages.
Hong et al., "Optical communication channel based on coincident photon pairs", Applied Optics, vol. 24, No. 22, Nov. 15, 1985, pp. 3877-3882.
Matsukevich et al., "Bell Inequality Violation with Two Remote Atomic Qubits", Physical Review Letters, vol. 100, Apr. 18, 2008, pp. 150404-1-150404-4.
Kong et al., "Implementation of Multiparty quantum clock synchronization", arXiv:1708.06050v2, 2017, 6 pages.
Venkatasubramanian, Nalini, "Time in distributed Systems", 66 pages.
Kim et al., "Delayed "Choice" Quantum Eraser", Physical Review Letters, vol. 84, No. 1, Jan. 3, 2000, 5 pages.
Butner et al., "Nanosecond-scale Event Synchronization over Local-area Networks", Proceedings of the 27th Annual IEEE Conference on Local Computer Networks, 2021, 9 pages.
Wittje, Roland, "Noise: From nuisance to research subject", Physics Today 73, Feb. 2020, pp. 8 pages.
Quan et al., "Nonlocal temporal correlation identification of entangled photon pairs for quantum clock synchronization", 10 pages.
Boughn, Stephen, "Making Sense of Bell's Theorem and Quantum Nonlocality", Found Physics, 2017, 18 pages.
D'Ambrosio et al., "Complete experimental toolbox for alignment-free quantum communication", Nature communications, vol. 3, 2012, 8 pages.
Altepeter et al., "Phase-compensated ultra-bright source of entangled photons", Optics Express, vol. 13, No. 22, Oct. 31, 2005, pp. 8951-8959.
Martin et al., "Quantifying Photonic High-Dimensional Entanglement", vol. 118, issue 11, Mar. 17, 2017, pp. 110501-1-110501-5.
Das et al., "Robust quantum network architectures and topologies for entanglement distribution", Physical Review A 97, 2018, pp. 012335-1-012335-12.
Ekert, Artur K., "Quantum Cryptography Based on Bell's Theorem", Physical Review Letters, vol. 67, No. 6, Aug. 5, 1991, pp. 661-663.
Bennett et al., "Teleporting an Unknown Quantum State via Dual Classical and Einstein-Podolsky-Rosen Channels", Physical Review Letters, vol. 70, No. 13, Mar. 29, 1993, pp. 1895-1899.
Bennett et al., "Entanglement-Assisted Classical Capacity of Noisy Quantum Channels", Physical Review Letters, vol. 83, No. 15, Oct. 11, 1999, pp. 3081-3084.
Lloyd et al., "Long Distance, Unconditional Teleportation of Atomic States via Complete Bell State Measurements", Physical Review Letters, vol. 87, No. 16, Oct. 15, 2001, pp. 167903-1-167903-4.
Jozsa et al., "Quantum Clock Synchronization Based on Shared Prior Entanglement", Physical Review Letters, vol. 85, No. 9, Aug. 28, 2000, pp. 2010-2013.
Bennett et al., "Purification of Noisy Entanglement and Faithful Teleportation via Noisy Channels", vol. 76, No. 5, Jan. 29, 1996, pp. 722-725.
Shi et al., "Privacy-preserving Quantum Sealed-bid Auction Based on Grover's Search Algorithm", Scientific Reports, vol. 9, 2019, pp. 1-10.
Demirel et al., "Correlations for computation and computation for correlations", Nature Partner Journals, vol. 7, 2021, pp. 1-8.
Gogo et al., "Comparing quantum and classical correlations in a quantum eraser", Physical Review A, vol. 71, 2005, pp. 052103-1-052103-6.
Agam et al., "Shot Noise In Chaotic Systems: "Classical" to Quantum Crossover", Physical Review Letters, vol. 85, No. 15, Oct. 9, 2000, pp. 3153-3156.
Stipcevic, Mario, "Quantum random No. generators and their applications in cryptography", Proc. of SPIE, vol. 8375, 2012, pp. 837504-1-837504-15.
Quan et al., "Demonstration of quantum synchronization based on second-order quantum coherence of entangled photons", Scientific Reports, vol. 6, 2016, pp. 1-8.
Bedington et al., "Progress in satellite quantum key distribution", Quantum Information, vol. 3, 2017, pp. 1-13.
Nolleke et al., "Efficient Teleportation Between Remote Single-Atom Quantum Memories", Physical Review Letters, vol. 110, Apr. 5, 2013, pp. 140403-1-140403-5.
Jung et al., "Remote Laser-Microwave Synchronization Over Kilometer-Scale Fiber Link With Few-Femtosecond Drift" Journal of Lightwave Technology, vol. 32, No. 20, Oct. 15, 2014, pp. 3742-3748.
Pant et al., Routing entanglement in the quantum internet, arXiv:1708.07142v2, Sep. 22, 2017, 13 pages.
Leung et al., "Deterministic bidirectional communication and remote entanglement generation between superconducting qubits", npj Quantum Information, vol. 5, 2019, 5 pages.
Kemparaj et al., "Secure precision time protocol in packet switched networks", IEEE, 2019, 6 pages.
Shih, Yanhua, "The physics of ghost imaging", Optical Society of America, 32 pages.
Mahmood et al., "Delay and Jitter Characterization for Software-Based Clock Synchronization Over WLAN Using PTP", IEEE Transactions on Industrial Informatics, vol. 10, No. 2, 2014, May 2014, pp. 1198-1206.
Paesani et al., "Generation and sampling of quantum states of light in a silicon chip", Nature Physics, 2018, 27 pages.
Joly et al., "Fibre-based pressure-controlled sources for quantum optics", STh1A.5, CLEO 2021, 2 pages.
Simon et al., "High-capacity quantum key distribution via hyperentangled degrees of freedom", New Journal of Physics, vol. 16, Jun. 24, 2014, 21 pages.
Shen et al., "Classically Entangled Vectorial Structured Light towards Multiple Degrees of Freedom and Higher Dimensions", STh1B.1, CLEO 2021, 2 pages.
Seijo et al., "Enhanced Timestamping Method for Sub-Nanosecond Time Synchronization in IEEE 802.11 over WLAN Standard Conditions", IEEE Transactions on Industrial Informatics, vol. 16, No. 9, Sep. 2020, pp. 5792-5805.
Liu et al., "General scheme for superdense coding between multiparties", Physical Review A, vol. 65, 2002, pp. 022304-1-022304-4.
International Search Report and Written Opinion received for corresponding PCT Patent Application No. PCT/ US2021/060655, mailed on Aug. 18, 2022, 9 pages.
International Preliminary Report on Patentibility received for corresponding PCT Patent Application No. PCT/ US2021/060655, mailed on Jun. 8, 2023 , 8 pages.
Achatz et al., "High-dimensional EPR entanglement from a SPDC source at telecom wavelength", arXiv: Quantum Physics, 2021, pp. 1-7.
Bauerle et al. "Coherent control of single electrons: a review of current progress", Rep. Prog. Phys., vol. 81, 056503, Apr. 5, 2018, 33 pages.

(56) References Cited

OTHER PUBLICATIONS

Erkmen et al.,"Ghost imaging: from quantum to classical to computational", Advances in Optics and Photonics, vol. 2. 2010, pp. 405-450.

International Search Report and Written Opinion received for corresponding PCT Application No. PCT/US2023/069109, mailed on Oct. 6, 2023, 11 pages.

Jin et al., "Long-range distribution of high-quality time-bin entangled photons for quantum communication", Journal of the Korean Physical Society, vol. 80, Dec. 2021, pp. 203-213.

Shapiro et al., "Classical Imaging with Undetected Photons" Scientific Reports, vol. 5, No. 10329, 2015, pp. 1-8.

Shapiro et al., "On-demand single-photon generation using a modular array of parametric down converters with electro-optic polarization controls," Opt. Lett., vol. 32, 2007, 2698-2700.

Wang, et al., "On-Demand Semiconductor Source of Entangled Photons Which Simultaneously Has High Fidelity, Efficiency, and Indistinguishability", Physical Review Letters, vol. 122, 113602, 2019, 6 pages.

Muller, et al., "On-demand generation of indistinguishable polarization-entangled photon pairs," URL: https://arxiv.org/ftp/arxiv/papers/1308/1308.4257.pdf, Aug. 21, 2013, 5 pages.

Clemmen, et al., "All-optically tunable buffer for single photons", Optics Letters, vol. 43, No. 9, Apr. 27, 2018, pp. 2138-2141.

Heshami et al., "Quantum memories: Emerging Applications and Recent Advances," Journal of modern optics, vol. 63, No. 20, 2016, pp. 2005-2028.

Cho, et al., "Highly efficient optical quantum memory with long coherence time in cold atoms", Optica, vol. 3, No. 1, Jan. 15, 2016, pp. 100-107.

Nunn et al., "Enhancing multiphoton rates with quantum memories", Centre for Quantum Technologies, Sep. 9, 2018, 5 pages.

Hamel et al., "Direct generation of three-photon polarization entanglement", Institute for Quantum Computing and Department of Physics & Astronomy, Apr. 28, 2014, 9 pages.

Mattle et al., "Dense Coding in Experimental Quantum Communication", Physical Review Letters, Jun. 17, 1996, vol. 76, No. 25, , pp. 4656-4659.

Chen et al., "Heralded Quantum Random Access Memory in a Scalable Photonic Integrated Circuit Platform", Optical Society of America, 2021, 2 pages.

Ball et al., "Quantum firmware and the quantum computing stack", Physics Today, Mar. 2021, vol. 74, No. 3, , pp. 28-34.

Kaczmarek et al., "A Noiseless Quantum Optical Memory at Room Temperature", Frontiers in Optics, 2017, 2 pages.

Li et al., "Quantum Supremacy Circuit Simulation on Sunway TaihuLight", URL:https://arxiv.org/pdf/1804.04797.pdf Aug. 13, 2018, pp. 1-11.

Zhang et al., "Examples on quantum search algorithm with optimized depth", Dec. 11, 2019, pp. 1-7.

Kanamori et al., "Three-party Quantum Authenticated Key Distribution with Partially Trusted Third Party", IEEE Global Telecommunications Conference, IEEE, 2008, 5 pages.

Weihs et al., "Violation of Bell's inequality under strict Einstein locality conditions", Physical Review Letters, vol. 81, No. 23, Dec. 7, 1998, pp. 5039-5043.

Smith et al., "Quantifying Coherence and Entanglement via Simple Measurements", arXiv:1707.09928v1, Jul. 31, 2017, 9 pages.

Ding et al., "The Cross-Correlation of Binary Sequences With Optimal Autocorrelation", IEEE Transactions On Information Theory, 2010, vol. 56, No. 4, Apr. 2010, pp. 1694-1701.

Shrivastav et al., "Globally Synchronized Time via Datacenter Networks", IEEE/ACM Transactions On Networking, Aug. 2019, vol. 27, No. 4, Aug. 2019, pp. 1401-1416.

Peloso et al., "Daylight operation of a free space, entanglement-based quantum key distribution system", New Journal of Physics 11, 2009, 13 pages.

Brunner et al., "Detection loophole in asymmetric Bell experiments", PRL 98, 220403, 2007, pp. 220403-1-220403-4.

Meyer-Scott et al., "Single-photon sources: Approaching the ideal through multiplexing", Review of Scientific Instruments, 2020, vol. 91, No. 4, 2020, pp. 041101-1-041101-18.

Saleh et al., "Towards spontaneous parametric down conversion from monolayer MoS2", Scientific Reports, vol. 8, No. 3862, 2018, 7 pages.

Fanto et al., "Multipli-entangled photons from a spontaneous parametric down-conversion source", Quantum Information and Computation, vol. 8057, 2011, pp. 805705-1-805705-12.

Ilic, Nikolina, "The Ekert Protocol", Journal of Physics, 334, Jul. 22, 2007, 4 pages.

Haider et al., "Entangling Independent Photons by Time Measurement", Nature Physics, vol. 3, Oct. 2007, pp. 692-695.

Zhuang et al., "Entanglement-Enhanced Lidars for Simultaneous Range and Velocity Measurements." Physical Review A, vol. 96, No. 4, Oct. 2017, pp. 040304-1-040304-6.

Guccione et al., "Connecting heterogeneous quantum networks by hybrid entanglement swapping", Sci. Adv., vol. 6, No. 22, 2020, pp. 1-6.

Gisin, Nicolas, "Entanglement 25 Years after Quantum Teleportation: Testing Joint Measurements in Quantum Networks", Entropy, vol. 21, 2019, pp. 1-12.

Anderson, Brian P., "Field Guide to Quantum Mechanics", SPIE Field Guides, vol. FG44, 2019, 152 pages.

Arrazola et al., "Quantum Fingerprinting with Coherent States and a Constant Mean Number of Photons", Physical Review A 89, 2014, pp. 062305-1-062305-6.

Kwiat et al., "New High-Intensity Source of Polarization-Entangled Photon Pairs", Physical Review Letters, vol. 75, No. 24, Dec. 11, 1995, pp. 4337-4341.

Zhao et al., "Experimental Demonstration of Five-photon Entanglement and Open-destination Teleportation", Nature, vol. 430, Jul. 2004, 19 pages.

Morrison et al., "High dimensional frequency-bin entanglement from domain engineered parametric downconversion", FM1N.1, CLEO, 2021, 2 pages.

Kashi et al., "Enabling Scalability of Photonic Frequency-Domain Quantum Processing", FM1N.4, CLEO 2021, 2 pages.

Chang et al., "Quantification of High-dimensional Energy-time Entanglement in a Biphoton Frequency Comb", FM3M.6, CLEO 2021, 2 pages.

Sloan et al., "Two photon emission from superluminal and accelerating index changes", FM3N.4, CLEO 2021, 2 pages.

Kviatkovsky et al., "Microscopy with undetected photons in the mid-infrared", FTh2O.5, CLEO 2021, 2 pages.

Goswami, Abhirup, "Analysis of a Deterministic Entangled Photon Pair Source using Single Photons", Sep. 2016, 79 pages.

Haroche, Serge, "Entanglement, Decoherence And The Quantum/Classical Boundary", Physics Today, vol. 51, Jul. 1998, pp. 36-42.

Brunner et al., "Bell nonlocality", Reviews of Modern Physics, vol. 86, 2014, pp. 419-478.

Merkouche et al., "Multiple pulse-mode Bell states heralded via entanglement swapping", JM4E.6, CLEO 2021, 2 pages.

Lee, Catherine, "High-Dimensional Quantum Communication Deployed Fiber", Feb. 2018, 143 pages.

Hu et al., "Beating the channel capacity limit for superdense coding with entangled ququarts", Science Advances, vol. 4 , Jul. 20, 2018, pp. 1-5.

Luo et al., "High-Reliability Sub-Nanosecond Network Time Synchronization Method Enabled by Double-Frequency Distributed Time Synchronization", Journal of Optical Communications and Networking, vol. 11, No. 1, Jan. 2019, pp. A40-A51.

Xie et al., "A High-Precision 2.5-ps RMS Time Synchronization for Multiple High-Speed Transceivers in FPGA", IEEE Transactions On Nuclear Science, vol. 66, No. 7, Jul. 2019, pp. 1070-1075.

Goswami et al., "Indefinite causal order in a quantum switch", Physical Review Letters, vol. 121, 2018, pp. 090503-1-090503-5.

Galvez, Enrique J., "Correlated-Photon Experiments Laboratory Manual", Colgate University, 2008, 27 pages.

Chen et al., "Joint Time and Frequency Dissemination Network Over Delay-Stabilized Fiber Optic Links", IEEE Photonics Journal, vol. 7, No. 3, Jun. 2015, 10 pages.

(56) References Cited

OTHER PUBLICATIONS

Sulimany et al., "All-Fiber Source and Sorter for Multimode Correlated Photons", JTh3A. 17, CLEO 2021, 2 pages.
Karlsson et al., "Quantum teleportation using three-particle entanglement", Physical Review A, vol. 58, No. 6, Dec. 1998, pp. 4394-4400.
Treiber et al., "A fully automated entanglement-based quantum cryptography system for telecom fiber networks", New Journal of Physics, vol. 11, Apr. 30, 2009, 20 pages.
Pfaff et al., "Unconditional quantum teleportation between distant solid-state quantum bits", Quantum Information, vol. 345, No. 6196, Aug. 1, 2014, pp. 532-535.
Rizzi et al., "White Rabbit Clock Synchronization: Ultimate Limits on Close-In Phase Noise and Short-Term Stability Due to FPGA Implementation", IEEE Transactions on Ultrasonics, Ferroelectrics, and Frequency Control, vol. 65, No. 3, Sep. 2018, pp. 1726-1737.
Mkacher et al., "Calibrating NTP", IEEE, 2019, 6 pages.
Chapman et al., "Hyperentangled Time-bin and Polarization Quantum Key Distribution", arXiv:1908.09018v3, 2020, 39 pages.
Mandel, L., "Proposal for almost noise-free optical communication under conditions of high background", J. Opt. Soc. Am. B, vol. 1, No. 1, Mar. 1984, pp. 108-110.
Ursin et al., "Quantum teleportation across the Danube", Nature, vol. 430, Aug. 19, 2004, pp. 849.
Ilo-Okeke et al., "Remote quantum clock synchronization without synchronized clocks", Npj Quantum Information, 2018, 5 pages.
Resch et al., "Distributing entanglement and single photons through an intra-city, free-space quantum channel", Optics Express, vol. 13, No. 1, Jan. 10, 2005, pp. 202-209.
Jennewein et al., "Quantum Cryptography with Entangled Photons", Physical Review Letters, vol. 84, No. 20, May 15, 2000, pp. 4729-4732.
Using coincidence correlation for studying quantum optic systems, Piqoquant GMBH, Jun. 1, 2018, 6 pages.
Time in distributed systems: clocks and ordering of events, Indian Institute of Technology Kharagpur, Department of computer Science and Engineering, 38 pages.
Time in distributed systems, University of Cambridge, Cambridge, UK, 20 pages.
Giovannetti et al., "Limits to clock synchronization induced by completely dephasing communication channels", Physical Review A, Jun. 17, 2002, vol. 65, 062319-1-062319-6.
Bennett et al., "Quantum cryptography: public key distribution and coin tossing," Theoretical Computer Science Theoretical Aspects of Quantum Cryptography, 2014, vol. 560, Part 1, pp. 7-11.
Kiesel et al., "Experimental Analysis of a Four-Qubit Photon Cluster State", Physical Review Letters, vol. 95, 210502, Nov. 18, 2005, pp. 1-4.
Aull et al.,"Geiger-Mode Avalanche Pholodiodes for Three-Dimensional Imaging", Lincoln Laboratory Journal, vol. 13, No. 2, 2002, pp. 335-350.
Avalanche Pholodiodes: A User's Guide, PerkinElmer, 2003, 8 pages.
Oh, J., et al.,"Coincidence Rates for Photon Pairs in WDM Environment", Journal of Lightwave Technology, vol. 29, No. 3, Feb. 1, 2011, pp. 324-329.
Grieve et al.,"Correcting for accidental correlations in saturated avalanche photodiodes", Optics Express, vol. 24, No. 4, Feb. 22, 2016, pp. 3592-3600.
Guo et al.,"Tesling the Bell inequality on frequency-bin entangled photon pairs using lime-resolved detection", Optica, vol. 4, No. 4, Apr. 2017, pp. 388-392.
Lee et al., "Temporal Multiplexing of Heralded Single Photon Sources Using Optical Fiber Delays", Korea Institute of Science and Technology Information-Korea Research Institute of Standards and Science, 2020, 3 pages.
Shi et al.,"Breakdown flash at telecom wavelengths in InGaAs avalanche photodiodes", Optics Express, vol. 25, No. 24, Nov. 27, 2017, pp. 30388-30394.
Wengerowskya et al., Entanglement distribution over a 96-km-long submarine optical fiber, PNAS, vol. 116, No. 14, Apr. 2, 2019, pp. 684-6688.
Bhandari et al., "Low-Cost Coincidence-Counting Electronics for Quantum Optics", Department of Physics, 2007, 2 pages.
Gentry et al.,"Quantum-correlated photon pairs generated in a commercial 45 nm complementary metal-Oxide semiconductor microelectronic chip", Optica, vol. 2, No. 12, Dec. 2015, pp. 1065-1071.
Rarity et al.,"Single-photon counting for the 1300-1600-nm range by use of Peltier-cooled and passively quenched nGaAs avalanche photodiodes", Applied Optics, vol. 39, No. 36, Dec. 20, 2000, pp. 6746-6753.
Park et al.,"High-performance reconfigurable coincidence counting unit based on a field programmable gate array", applied optics, vol. 54, No. 15, May 20, 2015, pp. 4727-4731.
Boso et al., "Low-cost and compact single-photon counter based on a CMOS SPAD smart pixel", IEEE Photonics technology Letters, vol. 27, No. 23, Dec. 1, 2015, 4 pages.
Unternahrer et al.,"Coincidence Detection of Spatially Correlated Photon Pairs with a Novel Type of Monolithic time-Resolving Detector Array", IEEE, 2017, 1 page.
Unternahrer et al.,"Coincidence detection of spatially correlated photon pairs with a monolithic time-resolving detector array", Optics Express, vol. 24, No. 15, Dec. 12, 2016, pp. 28829-28841.
Hong et al., "Measurement of Subpicosecond Time Intervals between Two Photons by Interference," Physical Review Letters, vol. 59, No. 18, 2044, Nov. 2, 1987, pp. 1-3.
Chen et al., "Experimental Demonstration of Conjugate-Franson Interferometry", Research Laboratory of Electronics, Massachusetts Institute of Technology, Cambridge, MA 02139 , USA, May 3, 2021, pp. 1-7.
Chen et al., "Supplemental Material for Experimental Demonstration of Conjugate-Franson Interferometry", Research Laboratory of Electronics, Massachusetts Institute of Technology, Cambridge, MA 02139, May 3, 2021, pp. 1-4.
Tittel et al., "Long-distance Bell-type tests using energy-time entangled photons", University of Geneva, Group of Applied Physics, 20, Rue de l'Ecole de Med'ecine, CH-1211 Geneva 4, Switzerland, Nov. 4, 2018, pp. 1-22.

* cited by examiner

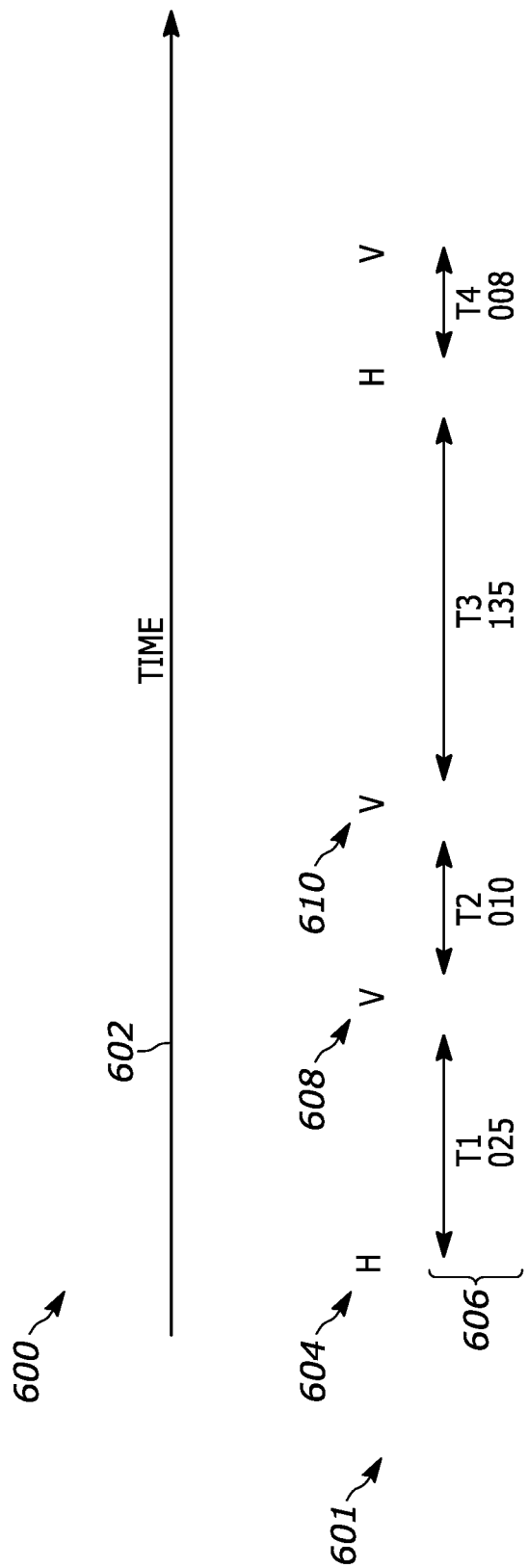

RECEIVER FOR VERIFICATION USING ENTANGLED PHOTONS

CROSS-REFERENCE TO RELATED APPLICATION

The present application is a continuation of Ser. No. 17/852,758, entitled "System and Method of Verification and Authentication using Entangled Photons", filed on Jun. 29, 2022, which is a non-provisional of U.S. Provisional Application Ser. No. 63/356,534, entitled "System and Method of Verification and Authentication using Entangled Photons", filed on Jun. 29, 2022. The non-provisional U.S. patent application Ser. No. 17/852,758 is also a continuation-in-part of U.S. patent application Ser. No. 17/465,235, entitled "Method for Synchronizing and Locking Clocks", filed on Sep. 2, 2021, which is a non-provisional application of U.S. Provisional Patent Application No. 63/118,542, entitled "System and Method for Sharing Quantum Entanglement", filed on Nov. 25, 2020, is a non-provisional application of U.S. Provisional Patent Application No. 63/186,754, entitled "System and Method for Sharing Quantum Entanglement", filed on May 10, 2021, and is a non-provisional application of U.S. Provisional Patent Application No. 63/218,433, entitled "System and Method for Sharing Quantum Entanglement", filed on Jul. 5, 2021. The entire contents of U.S. patent application Ser. Nos. 17/852,758 and 17/465,235, and U.S. Provisional Patent Application Nos. 63/356,534, 63/118,542, 63/186,754, and 63/218,433 are herein incorporated by reference.

INTRODUCTION

Entanglement is a valuable quantum resource that allows information to be shared between different users with properties that are not possible with classical sharing schemes. Methods and systems that support and improve the distribution and use of entangled quantum resources for various applications are and will be useful in advancing art.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

FIG. 6A illustrates state combs with timestamps for an embodiment of a system and method of authentication and verification using entanglement of the present teaching.

DESCRIPTION OF VARIOUS EMBODIMENTS

Figure 1:
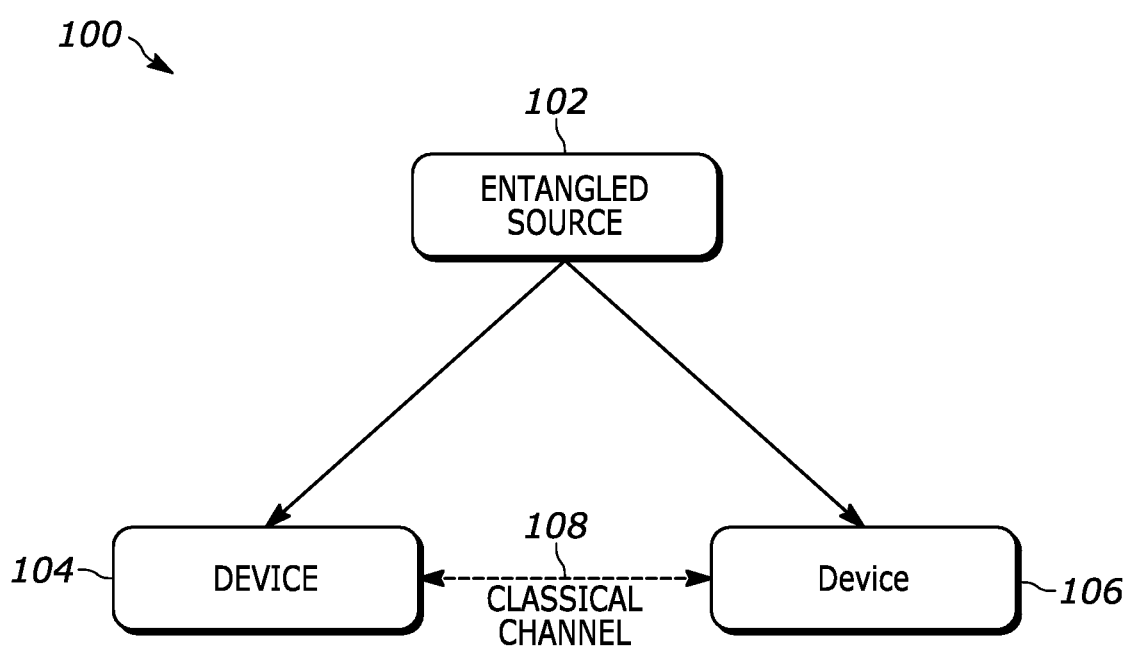
FIG. 1 illustrates an embodiment of an authentication and verification system and method using entangled photons of the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Entanglement is a resource that can be used in a variety of quantum and/or classical systems. Entanglement refers to a quantum system that shares quantum state information such that measurements of the system, even if performed at different times and/or places yields measured quantum states that are perfectly correlated.

One feature of the present teaching is that it supports the use of so-called "high brightness" single-photon sources to generate quantum entangled photon pairs that are shared. Some of these high-brightness sources create large numbers of quantum entangled pairs using Spontaneous Parametric Down Conversion (SPDC). These systems are optically pumped crystals with a laser source. The crystals emit photons that are entangled in one or more basis which may include polarization, frequency (color), space, and/or time. Photons that are entangled in more than one basis can be referred to as carrying a hyperentangled state. In this case, two or more different measured state values are correlated across the pair of entangled photons. Thus, the state of the photon emitted in this multi-dimensional quantum state can be measured and represented as having a time, a position, a frequency and/or a polarization. In various embodiments, numerous subsets of the possible states are generated, measured, formulated as a comb and/or shared as a comb. This can be a time-bin comb representation and/or a timestamp comb representation.

A comb is a list of values of selected measured states. Said another way, a comb is an ordered list of measurement events. In some embodiments, a comb is a list of measured states in the order they arrive at a measurement node and/or at a particular detector or group of detectors in the measurement node. In some embodiments, a comb is a list of measured states in an order they are measured. In some embodiments a comb is a list of measured states and/or the time of arrival. In some embodiments, a comb is an ordered list of measured events from different spatial positions. In other embodiments, a comb is an ordered list of measured events from different polarizations. In other embodiments, a comb is an ordered list of measured events from different colors. In yet other embodiments, a comb is a combination of measured events that may include any combination of the above and any other type measured events.

The comb time can be measured from various reference points in various embodiments. In some embodiments, the come time is measured using a local clock. In some embodiments, the local clock is synchronized in a relative and/or absolute basis to a non-local clock using systems and methods known by those skilled in the art. In some embodiments, the clocks are free running clocks that are synchronized using shared entanglement. In some embodiments, a comb includes more than one value per measured state. The value can be, for example, polarization, arrival time, frequency/color and/or spatial position. This is the case, for example, if an entangled state is a hyper-entangled state, where a single photon of a pair or set is entangled in more than one way (dimension or basis). In some embodiments, different members of a comb have different values. That is, a comb can include more than one type of entangled state where the more than one types are not entangled with each other. This could be the case, for example, if quantum states from two different sources generating entangled states were multiplexed. This could be done, for example, to increase the rate of entangled pairs being generated.

In SPDC sources, the time entanglement occurs as photons created by this process are "born" at the same moment in time with absolute precision ($\Delta t=0$), although the actual birth time is a random process and unknown and thus satisfies the superposition requirement for being quantum entangled.

The frequency, which can also be referred to in the art as color or wavelength, entanglement occurs due to the conservation of energy. For photons, $E=h\nu$ where h is Planck's constant and $\nu$ is the frequency. The energy in the laser pump photons (frequency/color) determines what frequencies are available to the entangled photons that are generated by the process. However, any given pair of generated photons can be in any allowed combination and thus the particular color is unknown at the source, satisfying the conditions for being quantum entangled. As one example, for frequency entanglement, if VL is the frequency of the pump and Vi is the frequency of the idler photon, and Vs is the frequency of the signal photon, then: $E=hVL=hVi+hVs$, or $E/h=VL=Vi+Vs$.

Polarization entanglement can be realized by using two crystals back-to-back with a length that is less than a coherence length of the pump source. Each crystal is configured to generate a particular polarization state of the output based on an input polarization of the pump. However, it is unknown at the output of the back-to-back crystals which crystal generated the pair, and thus what polarization state of a given pair is unknown at the source, satisfying the conditions for pairs being quantum entangled in polarization.

Spatial entanglement is realized by relying on conservation of momentum. In general, there can be multiple spatial directions along which pairs are provided that is based on the birefringent properties of the crystal. In these configurations, a particular one of two, or one of a continuous spatial region (e.g. a cone-shaped region) of a position of a particular pair is unknown at exit to the crystal. This then satisfies the conditions for pairs being quantum entangled in space. The spatial entanglement could be, for example, one of two positions, but it could also be entangled in more dimensions and up to a continuous set of dimensions.

A feature of the temporal and spatial bases, therefore, is that the amount of information of a particular measurement can be substantially higher than the amount of information in a basis of entanglement that is a "one of two" possibilities basis. Generally, depending on a particular basis type of the entanglement, the measurement can represent an outcome that is one of two, sometimes referred to as a qubit configuration, one of three, one of four, etc. up to a full continuum of values. It should be understood that the information within a continuum of values is only limited by the resolution of the measurement apparatus. We refer herein to the extent or number of possible measurement outcomes of a particular basis as the "state dimension" of the basis. It should be understood that the term "state dimension" is different from the term "dimension", which is also used herein as applied to entanglement. In the art the term "dimension" is sometimes another word for the term "basis". The usage is clear from the context of the discussion of the present teaching. One skilled in the art will appreciate that the quantum literature uses these various terms interchangeably.

Continuous values as part of an entanglement measurement are practically limited by the measurement resolution available for measuring that basis' dimensions. Entanglement basis types that provide a continuous set of values (continuous state dimension) are sometimes referred to as a continuous variable configuration. As described herein, both countable and continuous entangled dimensions are amenable to using the system and method of measurement comb sharing of the present teaching. Each type of basis provides various and sometimes different benefits, e.g. noise and/or background immunity, within a particular embodiment of a system and method of entanglement sharing that uses state combs of the present teaching.

One feature of the present teaching is that systems and methods of authentication and verification using entanglement can rely on entangled photons that are hyperentangled in time and polarization. We note that in the art, the terms "authentication" and "verification" are sometimes used interchangeably. For purposes of this disclosure, the term "verification" generally refers to a process that verifies an identity and/or an accuracy of data and/or the source of the data. The term "authentication" generally refers to the identification of and accuracy (e.g. trustworthiness) of a user and/or a role of a user connected to the generation of data. The data can include, for example, credit card numbers, prices, product codes, transaction data, and/or sensor data. Users can include individuals, but also may refer to a data generating device, for example, a robot, sensor or a terminal, which can have a role and/or identity as part of a system.

FIG. 1 illustrates an embodiment of an authentication and verification system 100 and method using entangled photons of the present teaching. An entangled source 102 generates pairs of entangled photons. One of the pair is sent to a device 104. The device 104 can be a handheld device, for example, a cell phone or other personal device. The other of the pair is sent to another device 106. The other device 106 can be, for example, an authentication terminal, a point-of-sale terminal, a system server, or numerous other processing devices. The device 104 and the device 106 are connected via a classical communication channel 108. The entangled source 102 delivers entangled photons to a device 104 and the other device 106. The device 104 can be, as just some examples, a cell phone, tablet, watch, card, personal locator, sensor and/or specialized processor. The other device 106 can be, as just some examples, a point of sale terminal, a computer, a laptop and/or any of a number of fixed or handheld processing devices.

The devices 104, 106 can be connected to users that need authentication and verification services that connect, stamp, notate, mark, or otherwise associate information transfer(s) between the two devices 104, 106. In one embodiment of the authentication and verification system 100 the device 104 is a handheld device and the other device 106 is an authentication terminal. But this is just one example. For example, and as understood by those skilled in the art, either of handheld device and/or the authentication terminal can be any of numerous elements that form two sides of an authentication or verification system. That could include, numerous fixed or mobile assets, for example, sensor devices, robots, various pieces of equipment, and/or various computing and processing systems.

The device 104 and the other device 106 measure the photons generated by the source 102 in at least two bases. In some embodiments, the bases can be polarization and time. In some embodiments, the bases can be position and time. In some embodiments, the bases can be position and polarization. A measurement comb that includes measurements of one of the bases is exchanged over the classical channel 108. Most of the examples presented herein use a comb that is a time-based comb, but in general a comb is an ordered list of measurement events and is not necessarily time-based. So, for example, a position and polarization measurement comb can be a list ordered by specific positions and the value of polarization associated with that position. Position measurement alone can be an ordered list based on the order of position. Position measurement alone can also be an ordered list based on the measured position value in a time order based on when the position is measured. What is characteristic of the operation of the method and system of the present teaching is that combs generated in two separate measurements, one for each of the pair of entangled photons, and associated background measurements are prepared with the same ordering scheme to support the efficient matching and pair identification using the two combs.

The classical channel 108 in some embodiments is a Bluetooth™ channel. Both the device 104 and other device 106 determine a match in the measurement comb. This can be achieved using for example, by cross-correlation or a process of offset and matching of the basis information that has been exchanged. The match information is used by both the device 104 and the other device 106 to determine which measured photon events are entangled. Those photons values, measured in the other basis become a shared secret held between the device 104 and the other device 106. That shared secret can be used as a one-time pad, cryptographic key, and/or a transaction identification number.

In some embodiments, the entangled source 102 generates photons at an output such that the device 104 needs to be placed by the consumer in a specific location. For example, the entangled source 102, might generate entangled photons that illuminate a small region in space, and the analyzer and/or detectors in the device 104 must be within the illuminated area. In some embodiments, the entangled source 102 generates photons that are spread over a larger area, and the device 104 can be placed within the larger area. In some embodiments, the entangled source 102 generates photons that are coupled into one end of an optical fiber and the device 104 is configured to plug into the other end of the optical fiber.

In some embodiments, the entangled source 102 generates photons that are entangled in more than two bases. The third basis is also measured by the devices 104, 106 and associated with the time of arrival. In some embodiments, the measurements of the values of the third basis are used to generate more bits of random number that can be used as a verification code. For example, a two-dimensional basis will yield one bit per measurement (a zero or a one, for H or V). An extra basis can add the additional dimension of that basis for each entangled pair. For example, three colors and two polarization provide five bits, so the values are coded as one of one through five values for each number. The third basis measurements can also be used as an error check. If a value of the one basis is measured to produce a random number value, but a value of the third basis is not available at that time of arrival, then an error condition can be raised.

The verification code can be used in numerous ways. For example, the verification code can be attached to a purchase by both the owner of the other device 106 and the owner of the device 104, as a unique identifier of the purchase. The verification code can be used as a crypto key for securely transmitting a credit card number of the user of the device 104, that can be decoded only by the owner of the device 106 to secure the card for only the particular transaction. Two verification codes can be used for both purposes on a single transaction. The verification code can be attached to transaction data associated with transaction between the devices 104, 106, thereby verifying the transaction. The verification code can be used by a sensor (e.g. device 104) when sending sensor data to a server (e.g. device 104) to uniquely identify the received data as being from a particular sensor. The verification code generated in one device 104 can be XORed with data in that device 104 to generate secret data (scrambled) and then the secret data subsequently XORed with a verification code generated in the other device 106 to regenerate the data (unscramble) if the two verification codes are derived from entangled pairs.

The verification code can also be used to authenticate a user of a device 104 or the device 104 itself. In some embodiments, the verification code is sent to a trusted authority that holds the verification code in a repository (not shown). In a subsequent transaction with device 104 that can be with the device 106 or with a completely different device (not shown), the transacting device 106 can query the repository, for example, but having the device 104 resend the verification code to the repository to determine if it matches, and the repository sends back an authentication if the sent verification code matches the stored verification code. This serves to authenticate a user of the device 104, the device 104 itself, a transaction being performed by the device 104 and other device 106, and/or data sent between devices 104, 106 that can be transaction data or other kinds of data. The verification code can be subdivided and different parts used for different purposes.

The verification code can be separately determined in each device 104, 106, and by the fact of entanglement correlation with be the same, yet not requiring communication of the code outside the devices, thus creating a shared secret. The shared secret can be used as a cryptographic key or onetime pad for the transfer of information such as credit card numbers, personal user data, or other sensitive information between the authentication terminal and the hand held device. The shared secret can be subdivided such that a portion is used for an authentication code and another portion is used as a cryptographic key or one-time pad. The verification code can be subdivided and each subdivided part used as described herein to perform each of multiple functions related to verification, identification and/or secrecy.

Figure 2A:
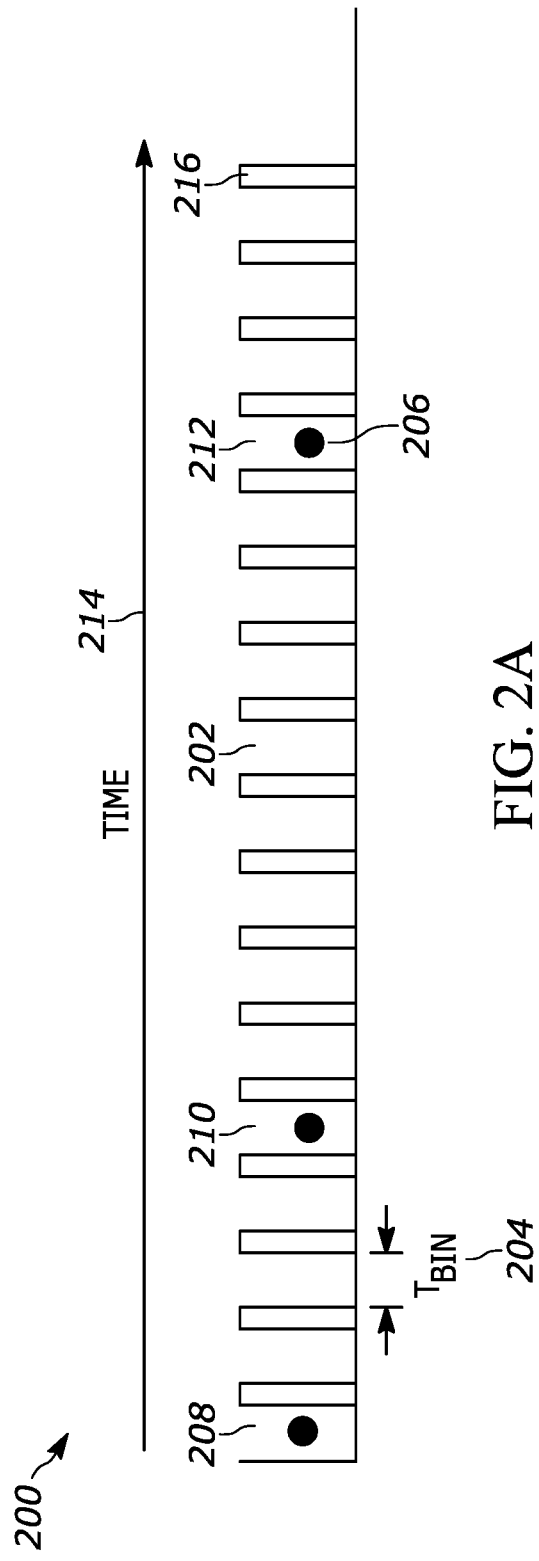
FIG. 2A illustrates an embodiment of a time-based state comb for an authentication and verification system and method using entanglement of the present teaching.

FIG. 2A illustrates an embodiment of a time-based state comb 200 for an authentication and verification system and method using entanglement of the present teaching. A time-based state comb 200 is defined by bins 202 having a bin length 204, $t_{bin}$, where events are inserted. The bins 202 progress along a continuous local time axis 214. A measurement of a single photon is placed in a time bin, forming an event 206 that corresponds to the time along the axis when it was sampled in a bin. In the comb 200 of FIG. 2A, there is an event in the first bin 208, the fifth bin 210 and the fourteenth bin 212, of the series of bins that run along the time axis 214.

In some embodiments, the bins 202 are separated by a bin separation time 216. This separation time 216 can be short or long compared to a bin length, $t_{bin}$, 204. The bin separation time 216 may be a period where no measurement can be made, for example a blanking time in a detector. Thus, the bin separation time 216 can result, for example, from limitations of the speed of the detector and/or measurement apparatus. The bin separation time 216 can also just be a period where no measurement is chosen to be made. The bin separation time 216 can be chosen to provide a desired time pattern of the comb 200. In some embodiments, the bin separation time 216 is substantially less than, e.g. <<1% of, the bin time 204.

An important feature of the present teaching is the realization that while some embodiments of a comb 200 of the present teaching demand stringent requirements on bin length 204 duration and/or bin separation time 216 duration, other embodiments are less dependent on the particular values of bin length 204 and bin separation time 216, as long as these parameters 204, 216 are well defined.

One feature of the present teaching is that cross correlation of combs generated through detection of pairs of entangled photons allows the sharing of the entangled quantum states in a way that is robust against noise and/or errors in the measurement. In an ideal case, correlating two combs of entangled pairs would yield a count of the number of pairs at the alignment condition and a count of zero at every other position. In practice, noise counts will errantly align, and so positions other than pair alignment will have non-zero counts. Combs may be configured to try to maximize the likelihood that when two combs are aligned, we have identified the correlated thus alignment of entangled photons. Comb processing benefits from the statistics of the pair creation versus the noise. Uncorrelated events that occur at the same time have probabilities that multiply. The entangled pair generation is guided by a probability of generation, which is in SPDC systems nominally proportional to pump energy. The noise photons occur in pairs with a probability of a single photon squared. This means the noise is naturally suppressed as compared to the signal of the correlated pairs during the process of adding the two combs at the alignment position.

Figure 2B:
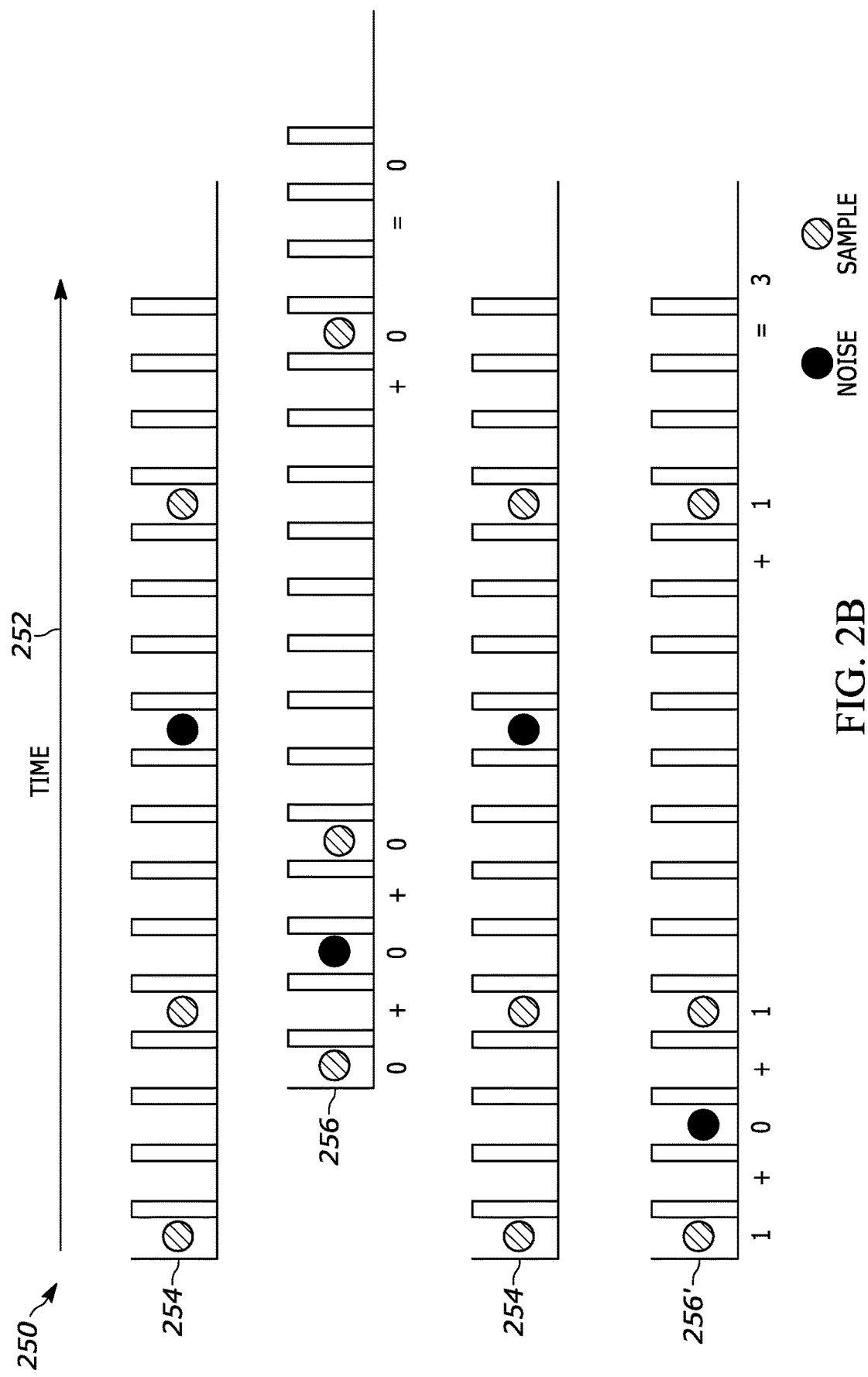
FIG. 2B illustrates an embodiment of a time-based state comb for an authentication and verification system and method using entanglement being correlated of the present teaching.

FIG. 2B illustrates an embodiment of a time-based state comb 250 for an authentication and verification system and method using entanglement being correlated of the present teaching. A time axis 252 represents local time at one measurement site that is receiving a stream of single photons having one of the pair of generated entangled pairs. In this case, the measurement site is the site associated with the comb 254. Similar to the comb described in connection with FIG. 2A, a measurement of a single photon is placed in a time bin, forming an event dot that corresponds to the time along the axis when the photon was sampled. In comb 254 representing measurements of a stream of one of the pair of entangled photons, there is an event in the first bin, the fifth bin, the tenth bin and the fourteenth bin. The events in the first, fifth and fourteenth bins are actual photon measurements and the tenth bin is a noise measurement.

In a comb 256 representing measurements of a stream of the photons of the other of the pair of entangled photons, there is an event in the first bin, the third bin and the fourteenth bin. The events in the first, fifth and fourteenth bins are actual entangled photon measurements and the third bin is a noise measurement. The time bins of two combs 254, 256 are slid by each other one-time bin at a time. That is, one comb is shifted by a fixed amount relative to the other, and a count of matches is taken at each offset. In some embodiments, the offset is one bin. At each discrete position, for example the point where time bins of equal size align, a count of the number of correlated measurements, for example, bins aligned that share the same event state, is made. This stepping through offset of combs and compare by adding up matches at each offset, can be performed using an algorithm. The algorithm looks for the position of the set of offset positions with a maximum number of correlated measurements. At a first point in the correlation, shown by combs 254, 256, there are no matched states, and the correlation value is zero.

If a noise event is measured on one comb and not the other, it is not counted. Because this represents a position where the measurement of pairs is not aligned, the only matches would be if two noise photons overlapped, or a noise event in one comb happened to match a detected pair photon. The time bins are matched for maximum cross-correlation when the count is maximized. This method of matching combs will be understood by those skilled in the art as the equivalent of a binary cross correlation function for vectors that consist of just 2 states, 1 and zero. For the example shown in FIG. 2B, that occurs where the three events line up. The maximum correlation occurs with the position shown in comb 254 and comb 256. The value is three matches. All other offset positions had fewer matches. There are no contributions from noise photons in this example. The number of calculations, or in this case, different relative comb positions that must be added, is equal to the number of time bins of a particular measurement comb. This is just an example, in some embodiments, combs can be thousands, hundreds of thousands, millions, or billions or more bins long and the process is the same.

As described herein, time bins 202 of a time-base state comb 200 may contain a variety of different kinds of state measurement values, including one or more values per photon (bin). For example, bins may contain markers that indicate simply that a photon was detected (sometimes referred to as an event), or they may include the actual measured value of one or more states of that detected photon (e.g., wavelength or polarization). If a measured value is available, a correlation is only counted if the measured value matches. This gives the correlation more specificity, and more noise immunity. This method will be understood by those skilled in the art as a variation on a cross correlation function, where rather than multiplying values and summing, we are only counting perfect matches. For example, if the states were 1, 2, 3, 4, 5 and two states matched with the value of 3, rather than multiplying 3×3 then as adding 9 to the total, this method would add 1 to the total.

It is possible to provide a closed-form assessment of the noise limits in some embodiments of the combs of the present teaching. For example, for a case of combs resulting from detections of pairs of entangled photons, we can define: 1) the P(Entangle Pair Generation)=P(EPG) as the probability in a single time window an entangled source will give birth to an entangled pair; 2) the P(Noise Detector 1)=P(ND1) as the probability in a single time window a noise photon will be detected at a first detector; and 3) the Prob(Noise Detector 2)=Prob(ND2) as the probability in a single time window a noise photon will be detected at a second detector.

The cross correlation is represented by a function:

$$C(k) = \Sigma_{k=-\infty}^{\infty} d1(m)d2(m-k).$$

For this function, k=offset (that is, the amount the comb is slid forward or backward in time), d1(m) is an array of event values at the first detector, and d2(m-k) is an array of offset (by k) event values at the second detector. The +/−∞ in this case is theoretical. In practical cases, you can stop calculating C(k) when you have exhausted the event set. Approaches for practical cross correlation and matching systems and methods are described in more detail later.

A match is found when a maximum is located for C(k) over all values of k. When the maximum is found, the combs are correlated when offset by k. The elements that match form a random set that is perfectly correlated with another random set.

Figure 3:
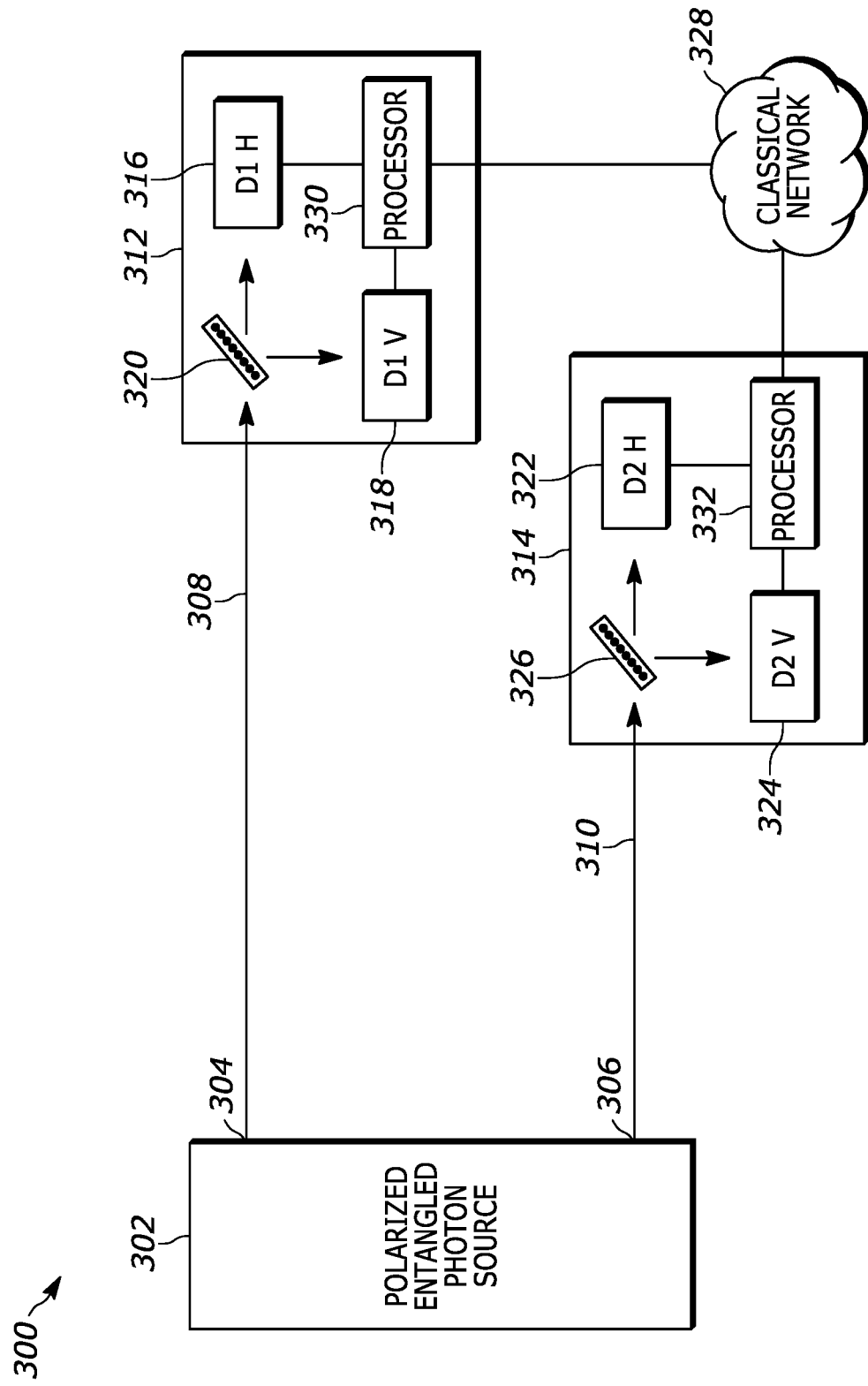
FIG. 3 illustrates an embodiment of a system for generating a shared measurement comb in time and polarization for an entangled photon authentication and verification system of the present teaching.

FIG. 3 illustrates an embodiment of a system 300 for generating a shared measurement comb in time and polarization for an entangled photon authentication and verification system of the present teaching. A polarization entangled source 302 produces entangled pairs that emerge from a pair of ports 304, 306. The first port 304 is illustrated as producing one of the pair of photons, and the second port 306 is illustrated as producing the other of the pair of photons. In some embodiments, the source 302 generates a photon at the first port 304 that is entangled in time and polarization with a photon that emerges at the second port 302. Thus, when a photon that emerges from the first port 304 is measured to determine its polarization and time of arrival, those two values will be correlated with the values of a measurement of polarization and time of arrival of the paired, entangled, photon that emerges from the second port 306.

We denote here the two polarization states as H and V as understood by those skilled in the art as being orthogonal dimensions of polarization. While H is associated with a horizontal dimension and V is associated with a vertical dimension, these are arbitrary designations. Values of polarization are random variables that emerge from the source ports 304, 306. The measured values of the random variables are perfectly correlated from pairs. In the case of polarization for many embodiments, measurement of a value H for one photon in a pair produces a value V for the other measured pair. However, the polarity of the correlation is arbitrary, and depends upon particulars of a measurement configuration. The key is that measured values can be correlated to find a match. Two different polarizations, then can represent a 1 and a 0, and therefore the set of measured pair values can be represented as a binary number. If only the polarization (or any two-state-dimension basis) is being used to find a match, it is clear that more than one or even two of the measured values are needed to establish the match.

It should be understood that a time of arrival of any given photon at a detector is determined by a path length from the source 302 to a detector and that this value of path length may change over time, both intentionally and non-intentionally. It should also be understood that it is a time between arrivals of photons from two different sets of entangled pairs that is the entangled resource. That is, a time between two successive single photon counts at detectors that are measuring two sets of pairs of time-entangled photons will measure the same time between events that represent detection of a single photon. The actual time may be the same as measured against a common clock, but is more likely to be quite different. It is possible to account for this time of flight difference using an external system that monitors and tracks any offset and reports it to the receivers so that it can be accounted for. Alternatively, the receivers themselves can derive time of flight information and do local reconciliation.

In some specific embodiments that do not limit the scope of the invention, the entangled photon source 302 is a crystal pumped by a laser that generates time and polarization entangled photons via spontaneous parametric down conversion. One of the entangled pairs emerges from port 304, and the other emerges from port 306. The time of photon generation is random; however, it is understood that the pairs of photons are always generated at precisely the same time. Also, the polarization of the photons is random. However, the pairs of photons when measured, will always be correlated but will have the same or the opposite polarization depending on the specific crystal used and also the configuration of the detector. The photons are routed over optical paths 308, 310 to two receivers 312, 314. The optical paths 308, 310 can be free space paths or any kind of guided paths, such as a fiber optic links or integrated optical waveguides. It should be understood that the numerous applications of the methods and apparatus of the present teaching will require optical paths that are very short for use in, for example, integrated components and/or mini-free-space optical bench systems, relatively short for use in, for example, a data or computing center, as well as relatively long for use in, for example, applications requiring a long-distance terrestrial, undersea link and/or satellite link. In other words, depending on the application, the optical paths 308, 310 can be on order of microns to on order of many thousands of kilometers.

The first receiver 312 includes a first single photon detector 316 and a second single photon detector 318. The detectors 316, 318 have inputs that are positioned in the optical paths of the outputs of a polarization beam splitter 320. The polarization beam splitter 320 is oriented to pass H-polarized photons to the input of the first detector 316 and to pass V-polarized photons to the input of the second detector 318. A polarization beam splitter 320 is shown for embodiments where the second basis, other than time, is polarization. More generally, an optical analyzer can be used that directs photons having one state to the detector 316 and photons with the second state to the second detector 318. Thus, the receiver is able to distinguish quantum states of the basis other than time based on which detector detects the particular photon. The time basis is measured by the arrival time of the particular photon at the particular detector 316, 318.

The second receiver 314 includes a first single photon detector 322 and a second single photon detector 324. The detectors 322, 324 have inputs that are positioned in the optical paths of the outputs of a polarization beam splitter 326. The polarization beam splitter 326 is oriented to pass H-polarized photons to the first detector 322 and to pass V-polarized photons to the second detector 324. As with receiver 312, this receiver can also be configured to measure other two, and higher, dimensioned entangled photon but using an analyzer that directs the photon to a detector 322, 324 based on the value of the state.

The two receivers 312, 314 are also connected via a classical network 328. In various embodiments, the classical network 328 can be any of a variety of known networks. For example, the networks can be fiber optic networks, wireless networks, satellite networks, free space optical networks and/or combinations of these networks. The network can include one or more Bluetooth communication channels. A key feature is that it is not necessary that the networks have any particular performance characteristics, such as latency guarantees, timing and/or synchronization requirements, packet loss performance and other known network performance metrics. Either of the two receivers 312, 314 could be part of, for example, the device 104 or the other device 106 of FIG. 1, and the other of the two receivers 312, 314, could be part of the other of the two device 104 or other device 106.

In many embodiments of the system of the present teaching, the receivers 312, 314 have information on timing of every, or early every photon arrival. This information can be derived through a combination of arrivals detected in the detectors 316, 318 or detectors 322, 324 in a given receiver 312, 314, as well as can the polarization of each arrival. For example, the detectors can be configured to generate an electrical signal in response to receiving a single photon in a first state of polarization at a particular time. This allows the measurement of both the time of arrival and the polarization state. Some or all of this information may be included in the comb generated by the processor 330, 332 and shared. That is, the processors 330, 332 can process the electrical signals from each detector, that include information regarding arrival time of a photon and a polarization state for each measured photon, in a way that uses some or all of the measured state information as needed by a particular comb for a particular application. Combs may include, for example, a list of times of arrival (timing comb) and no polarization state information, and/or a comb may be generated to include polarization values and time of arrival. A sequential list of polarizations may also be generated using the single photon events captured by the detectors 316, 318, 322, 324.

The system 300 of FIG. 3 can be used for applications that share a random number that can be used for authentication and verification. This shared random number is also secret, in that only the two receivers 312, 314 have the shared value. In this application, one of the pair of photons arrive at the D1 receiver 312. After passing through or being reflected by the polarization beam splitter 320, they are detected by either detector D1H 316 or detector D1V 318 based on their polarization. The time of detection and the polarization are recorded in a timing comb generated in processor 330 as described herein. One of the pair photons arrive at the D2 receiver 314. D2's polarization beam splitter 326 is oriented for the same basis as D1's beam splitter 320. When the one of the pair of photons strike the polarization beam splitter, they are routed to either detector D2H 322 or detector D2V 324 based on their polarization. The time of detection of and the polarization are recorded in a second timing comb generated in processor 332 as described herein.

Processor 330 in D1 receiver 312 shares its timing comb over a classical channel provided by the classical network 328 with just a mark indicating windows where a detection occurred and not the polarization measured for the photon that is sampled at the mark. Processor 332 in D2 receiver 314 then slides its generated comb in time through the comb generated by processor 330 and counts the number of correlated detector hits. By sliding, we mean comparing the two lists at each of a series of different time shifts between the two lists. By comparing, we mean adding the number of matches per relative time position of the shift. So together by sliding and comparing, we are referring to the ability to generate a cross-correlation of the two lists. When the number of correlated detector hits is maximized, processor 332 in receiver D2 314 uses its measured polarizations in those bins as the correlated data which becomes the shared secret.

Although it is not shown in FIG. 3, either or both of the receivers 312, 314 can include quantum storage in front of the analyzer, polarization device 326, that holds the entangled photons for a set period of time and can be used to manage the timing of the measurement of the entangled state.

This process of sliding combs to generate a maximum may be referred to herein as a quantum cross-correlation. By sliding the combs in the processor 332 to achieve maximum correlation, the time-of-flight from the entangled source to each of the receivers is zeroed out and immaterial to the outcome. It is understood by those skilled in the art that either receiver 312, 314 can perform the process of sliding combs to determine a maximum. As understood by those skilled in the art, if a fixed path length offset is established between the two nodes, then the time position, or relative offset, determined by the finding of the maximum in the auto-correlation tracks any changes in the relative path length. Thus, the combs of the present teaching can be used to determine relative positions, or relative changes in path length from source 302 to receiver 312, 314 in the system 300. The processors 330, 332 use the polarization values of the matching values found in the correlation as a shared random number.

Referring back to FIG. 1, a portion of the shared random number generated by the handheld device 104 is used as one side of a verification code. A corresponding portion of the shared random number generated by the authentication terminal 106 is used as the other side of a verification code. A portion of the shared random number is the verification code used by the verification application. When the verification codes are compared and match, a verification process is complete, and the handheld device, or an application or data in the handheld device associated with the verification code, is then verified by the verification terminal. The matching process finds the values that are the random number, and in some embodiments a predetermined assignment of which portion of the matched values determines the start and stop of the portion of the random number that are verification codes.

The particular configuration of the receivers 312, 314 that include a polarizing directing element 320, 326 is just one specific example. The receivers may be constructed more generally so long as each detector generates an electrical signal at an output in response to receiving a single photon in a particular state of an entangled system's possible states.

A method for determining quantum entangled state information according to the present teaching includes generating a plurality of first photons and generating a plurality of second photons, wherein the first and the second photons have entangled quantum states. The plurality of first and the plurality of second photons are entangled in at least one basis that can include polarization, wavelength, space, and/or time. A first ordered list of events is generated in response to measuring at least one of a first and second quantum state of at least some of the plurality of first photons. A second ordered list of events is generated in response to measuring at least one of the first and second quantum state of at least some of the plurality of second photons. In various methods, the first and second ordered list of events can include an ordered list of arrival times of single photons, differences between arrival times of single photons, an ordered list of polarization measurements, an ordered list of wavelengths, or an ordered list of spatial position measurements.

The measuring at least one of the first and second quantum state of at least some of the plurality of first photons can be performed at a physically different location than the measuring of at least one of the first and second quantum state of at least some of the plurality of second photons. The first and second ordered list of events are then compared to identify entangled quantum state information from the entangled quantum states.

A method for authentication and verification using entangled photons according to the present teaching includes measuring a first plurality of quantum states and generating a first list comprising values related to the measured first plurality of quantum states. A second plurality of quantum states, where at least some of the second plurality of quantum states are correlated with at least some of the first plurality of quantum states is measured. A second list based on the measured second plurality of quantum states is then generated. The first and second lists can be lists of, for example, arrival times, differences between arrival times, time bins, polarizations, wavelengths, spatial positions and any combination thereof. The generated first list and generated second list are compared to find related elements. The comparing can include a correlation or one of numerous types of pattern matching. The comparing can also include sending at least part of one of the first and second list over a network. This method can include generating timestamps and adding the timestamps to at least one of the first and second list. A shared secret is then generated in response to at least two values of the related elements.

A method of determining quantum entanglement according to the present teaching includes generating an electrical signal in response to detecting a plurality of single photons. The generated electrical signal is then processed to generate a list representing a plurality of arrival times and polarizations of detected single photons. Some of these methods also include converting the list representing a plurality of arrival times and polarizations of detected single photons into a list comprising time bins. The processing the electrical signal to generate the list representing the plurality of arrival times and polarization of detected single photons comprises determining a time between detector hits for at least one polarization state and recording the time as a number. The generated list is then compared with a second list to determine at least one shared entangled quantum state. The comparison can, for example, be a correlation, and/or finding matches or some kind of relationship between the generated list and the second list at different relative positions of elements in the generated list and the second list. Once the matches are found, the polarization values associated with each matched item in the generated list and second list are used as a random number. The random numbers in each node derived in this way are correlated, and known only by the local nodes. As such, these random numbers in each node can form a shared secret random number.

Referring back to FIG. 1, a portion of the shared secret random number generated by the handheld device 104 is used as one side of a verification code. A corresponding portion of the shared secret random number generated by the authentication terminal 106 is used as the other side of a verification code. A portion of the shared secret random number is the verification code used by the verification application. When the verification codes are compared and match, a verification process is complete, and the handheld device, or an application or data in the handheld device associated with the verification code, is then verified by the verification terminal. The matching process finds the values that are the shared secret random number, and in some embodiments a predetermined assignment of which portion of the matched values determines the start and stop of the portion of the random number that are verification codes.

Figure 4:
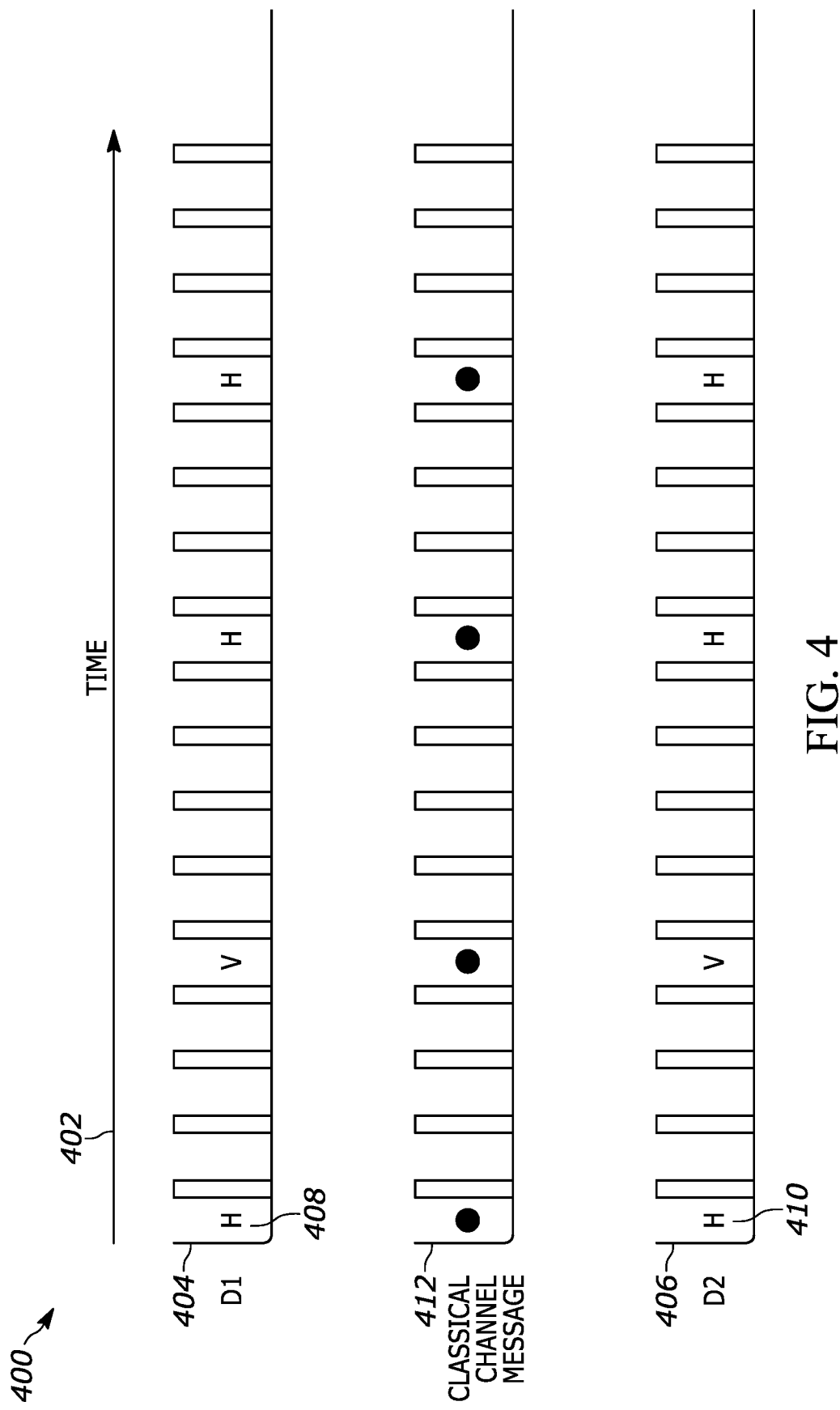
FIG. 4 illustrates generated combs for an embodiment of an authentication and verification application using entangled photons of the present teaching.

FIG. 4 illustrates generated combs 400 for an embodiment of an authentication and verification application using entangled photons of the present teaching. The combs 400 are generated with respect to a time axis 402, and the alignment shown of the different combs 404, 406, 412 in the figure is illustrates a relative position for each comb when the autocorrelation has been maximized. This alignment is more of a conceptual construct as it is determined after the data has been collected and does not reflect any sort of real-time operation. The time base 402 is illustrated to represent a common time base for receivers in two different locations to establish a common sequence of events with, for example, offset times that can be quantified relative this common time base 402. Alignment with respect to this time base 402 is performed after the fact of measurement and time base 402 can be arbitrary. In some embodiments, time-base is a local clock in one or the other nodes.

Referring to both FIGS. 3 and 4, the comb 404 can be generated by the first receiver 312 and the comb 406 can be generated by the second receiver 314 and are illustrated with particular measured values of polarization 408, 410 (H or V) in each time bin. As can be seen, photons were measured in bins 1, 5, 10 and 14. Empty time bins have no measured photons. A comb 412 is generated to be sent by the classical channel by receiver D1 312. This comb only exposes the time bins (1, 5, 10 and 14) that measured photons, not the values of polarization. The sharing of this comb 412 with receiver 314 and correlation processing in D2 receiver 314 with comb 410 reveals the values of the polarization that represent the shared, secret, random number. This is just one example of how pattern matching can be used to determine the correlated quantum states, which can then be used to share a secret that comprises a set of random values.

When available, combs can also contain information from a local clock. In this example, a time comb includes a time stamp from a local clock at the detector. The indication of what time it is marking is arbitrarily chosen by the user, but in this case, let's say it's pointing at the first bin. The time stamp is the setting on the local clock at the detector when first bin detected that photon. The time stamp is appended to the comb 412. As described in more detail below, time stamps can be used as follows: 1) to measure the relative distance of two receivers from the source because the difference in time stamp values is the difference in flight time; 2) if the distance is known, a time stamp can be used to synchronize the clocks at two different receivers; 3) if the link is initially known to be clear of eavesdroppers, a change in the difference between time stamps between two receivers can be used to identify the eves dropper's presence, as the eves dropper adds latency.

Figure 5:
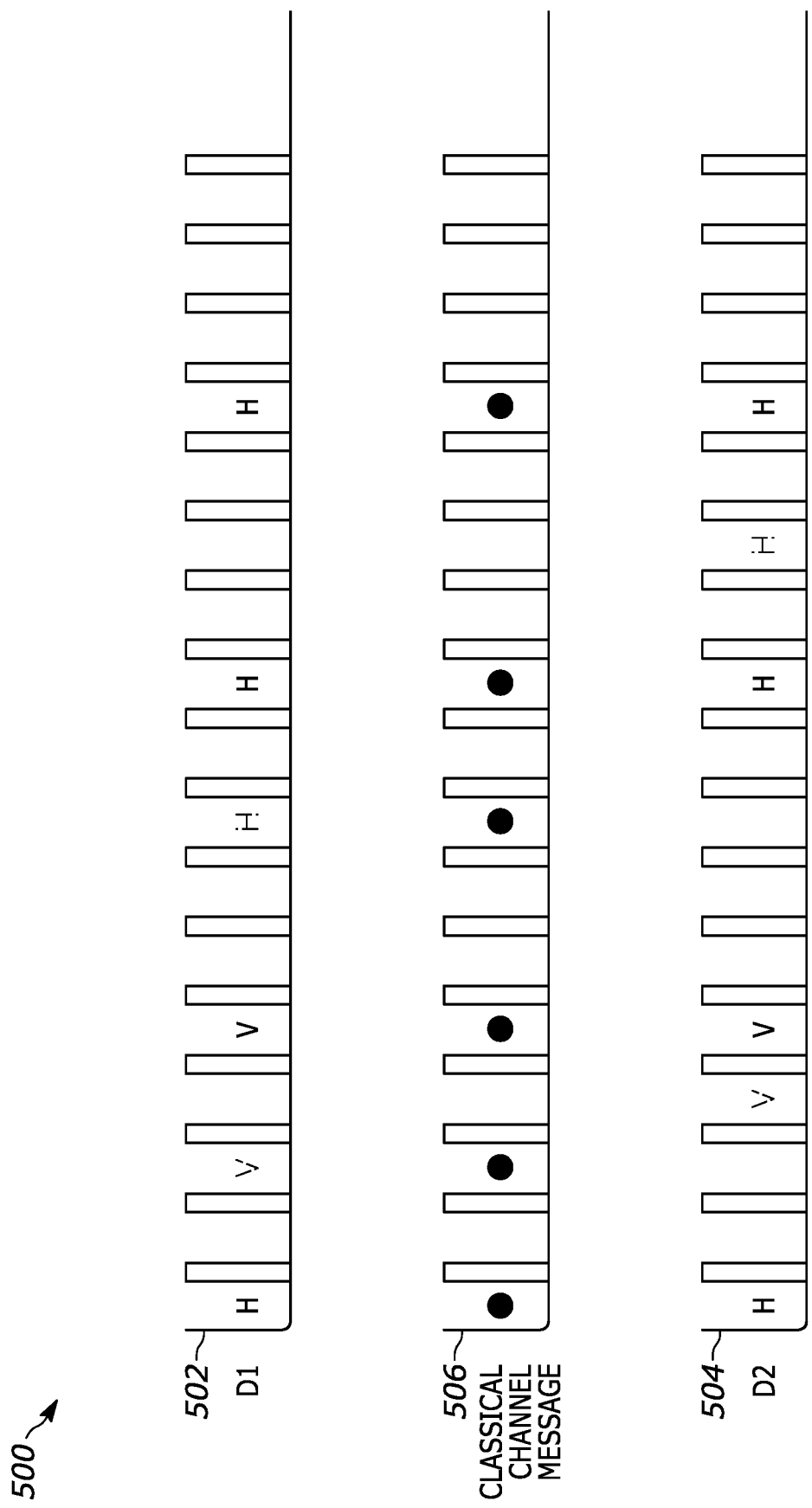
FIG. 5 illustrates embodiments of generated state combs with noise in an embodiment of an authentication and verification application using entangled photons of the present teaching.

Noise can cause detector counts in time bins that are from unwanted sources such as ambient photons and thermal detector noise. Measurement combs according to the present teaching can help to filter out these noise events. FIG. 5 illustrates embodiments of generated combs 500 with noise in an embodiment of an authentication and verification application of the present teaching. Referring to both FIGS. 3 and 5, a comb 502 generated by the first receiver 312 and a comb 504 generated by the second receiver 314 are illustrated with particular measured values of polarization (H or V) in each time bin. As can be seen, photons were measured in bins 1, 3, 5, 8, 10 and 14 in comb 502. Photon were measured in bins 1, 4, 5, 10, 12 and 14 in comb 504. Empty time bins have no measured photons. Noise photons are illustrated in grey and are in bins 3, and 8 in comb 502. Noise photons are in bins 4 and 12 in comb 504. A comb 506 is generated to be sent by the classical channel by receiver D1 312. This comb only exposes the time bins (1, 3, 5, 8, 10 and 14) that indicate measured photons, not the values of polarization. The sharing of this comb 506 with receiver 314 and correlation processing in D2 receiver 314 with comb 504 reveals the values of the polarization that represent the shared, secret, random number. The only noise events that will result in undetected errors, are noise events that occur in the same time bin for both D1 and D2. If the probability of a noise event in a given time bin is x, and noise events in the idler and signal paths are independent, then the probability of a simultaneous noise event is $x^{**}2$. For example, if noise events occur in 1/1000 of time bins, then the undetected error probability is 1/1,000,000.

The combs illustrated in FIGS. 2A-B, 4 and 5 can be referred to as time bin combs that include regularly spaced bins that contain events when a measurement of that event coincides with the particular bin time, or happens during a time that falls in a particular bin. It is also possible to mark events with timestamps. The scheme for marking events does not change the basic idea of the combs and comb matching, but it can have effects on how the matching process is done and/or the resolution of the time aspects of the state values. One feature of the authentication and verification using entangled photons of the present teaching is that the shared random numbers can be generated by either using time bin combs or timestamps.

FIG. 6A illustrates state combs 600 with timestamps for an embodiment of a system and method of authentication and verification using entanglement of the present teaching. This embodiment relies on event combs that comprises events and a measured time between each event. For example, an event could be a single photon arrival and the time between arrivals can be provided in the comb. As another example, an event can include determination of a polarization state of an arrived photon and the comb presents both a polarization state and a measured time between arrivals.

Referring back also to FIG. 3, receiver 312 detects the single photons from a port 304 of the source 302 and generates electrical signals representing the time of arrival and polarization of detected photons. The processor 330 converts these electrical signals into a comb 601 that is illustrated with respect to local measurement time base 602. This comb presents measured polarization states, H or V, 604, 608, and time between arrivals 606. In this example, the first polarization state is H 604, a time elapses of 0.025 seconds 606, and then a second polarization state of V 608 is measured, followed by a time duration of 0.01 seconds to a third detection, in this case a V, and so on. The processor determines state and the time between detector hits that is recorded a number. This is in contrast, for example, to the combs 400 described in connection with FIG. 4, where detections are connected to a bin number. Comb 601 can be thought of as a continuous-time comb, or a time-stamp comb, as compared, for example to time bin combs 400 illustrated in FIG. 4. The comb 601 can be simply represented as a message, for example, H025V010V135H008 that is sent over the classical network 328 to the second receiver 314. Or the comb does not include the polarization values, so that those values remain local, in which case the message could be, for example, 025,010,135,008.

A feature of the present teaching is that by comparing local current time stamp with the header, it has been determined that offsets in timing between the two receivers 312, 314 can be precisely tracked. Such information could be used for numerous applications and systems can be configured to achieve difficult or even otherwise impossible tasks. For example, if differences in optical path delays between receivers 312, 214 and source 302 are known or separately tracked, sharing the comb 601 with timestamps can maintain extremely precise or even near or essentially perfect synchronization of the local clocks in the receivers 312, 314. Since for example, SPDC systems generate entangled photons at exactly the same instance in time, wherein the synchronization accuracy of such a system is only limited by the precision of the detectors. In some systems, the precision will essentially depend only the accurate of the relative positions, which can be determined with a high level of precision with interferometric techniques. In some particular methods according to the present teaching, regardless of the known offset in transit time, the second receiver 314 adjusts the local clock by finding the difference between the timestamps, taking account of time-of-flight offset, and adjusting the local clock based on the remaining difference that represents a synchronization error.

As another example, if precise free running clocks are available in the receivers 312, 314, sharing the comb 601 with timestamps can be used to determine optical path differences between the nodes 312, 314 and/or source 302. The differences can be intentional differences that might be part of a signaling scheme. The difference can be unintentional differences, that might be used to correct or control other timing-based processing that is ongoing within and amongst the receivers 312, 314. The local clock adjustment and/or optical path difference determinations can be included as part of the authentication and verification system. In some embodiments, some of the measured state values are applied to the adjusting and/or path difference determinations and others of the measured state values are applied to the verification code.

Figure 6B:
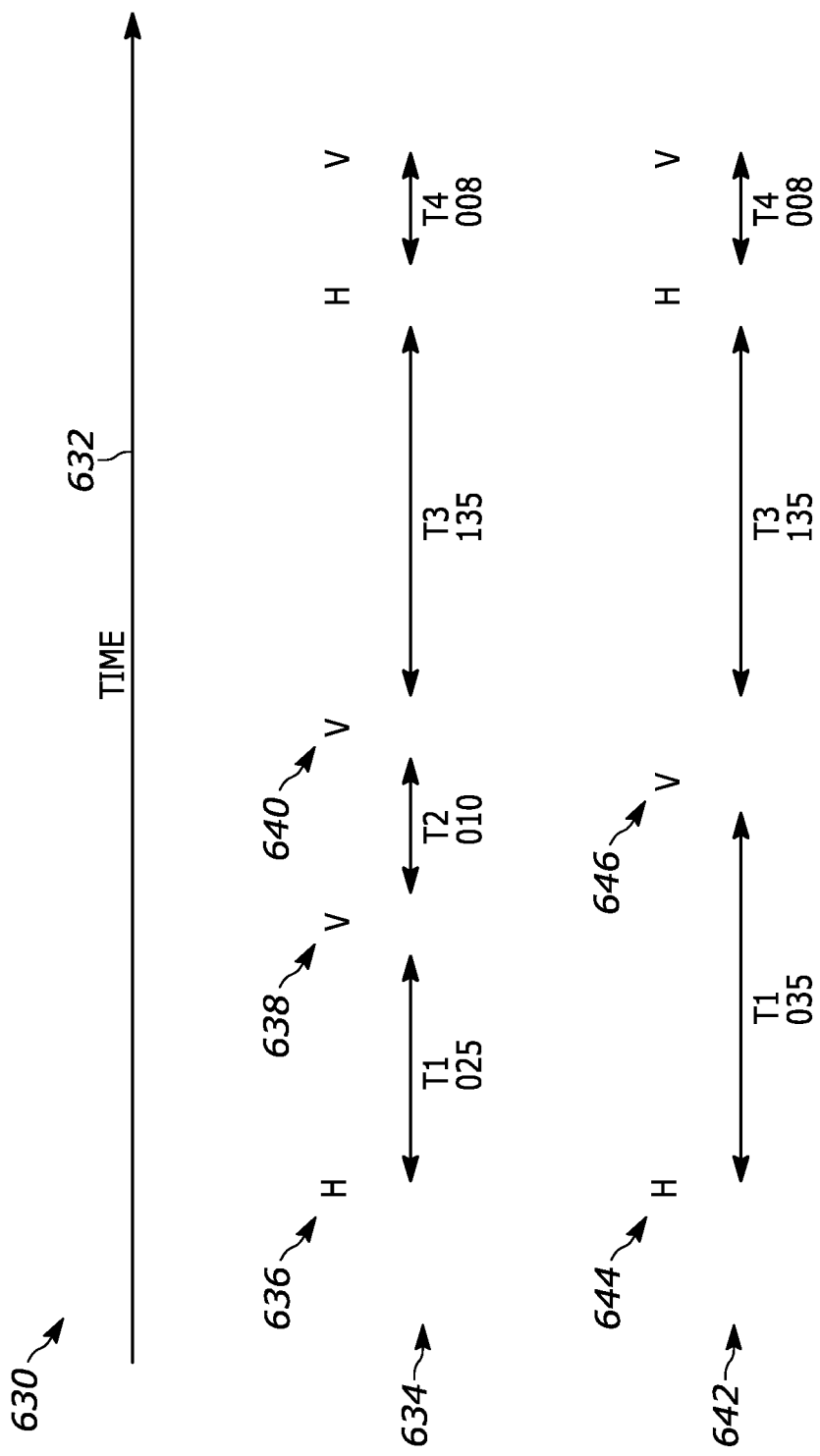
FIG. 6B illustrates the embodiment of state combs for the system and method of authentication and verification using entanglement with noise of the present teaching.

FIG. 6B illustrates the embodiment of state combs 630 for the system and method of authentication and verification using entanglement with noise of the present teaching. The event measurements along time axis 632 include a pair photon H 636, then a noise, or errant, measurement V 634 0.025 seconds later, then a pair photon V 640 0.10 seconds later, and so on. The other pair measurement system receives in comb 642 a pair H 644, then a pair photon V 646 0.035 seconds later, and so on. The first pair comb may be represented H025V010V135H008V. The second pair comb may be represented H035V135H008V.

Figure 6C:
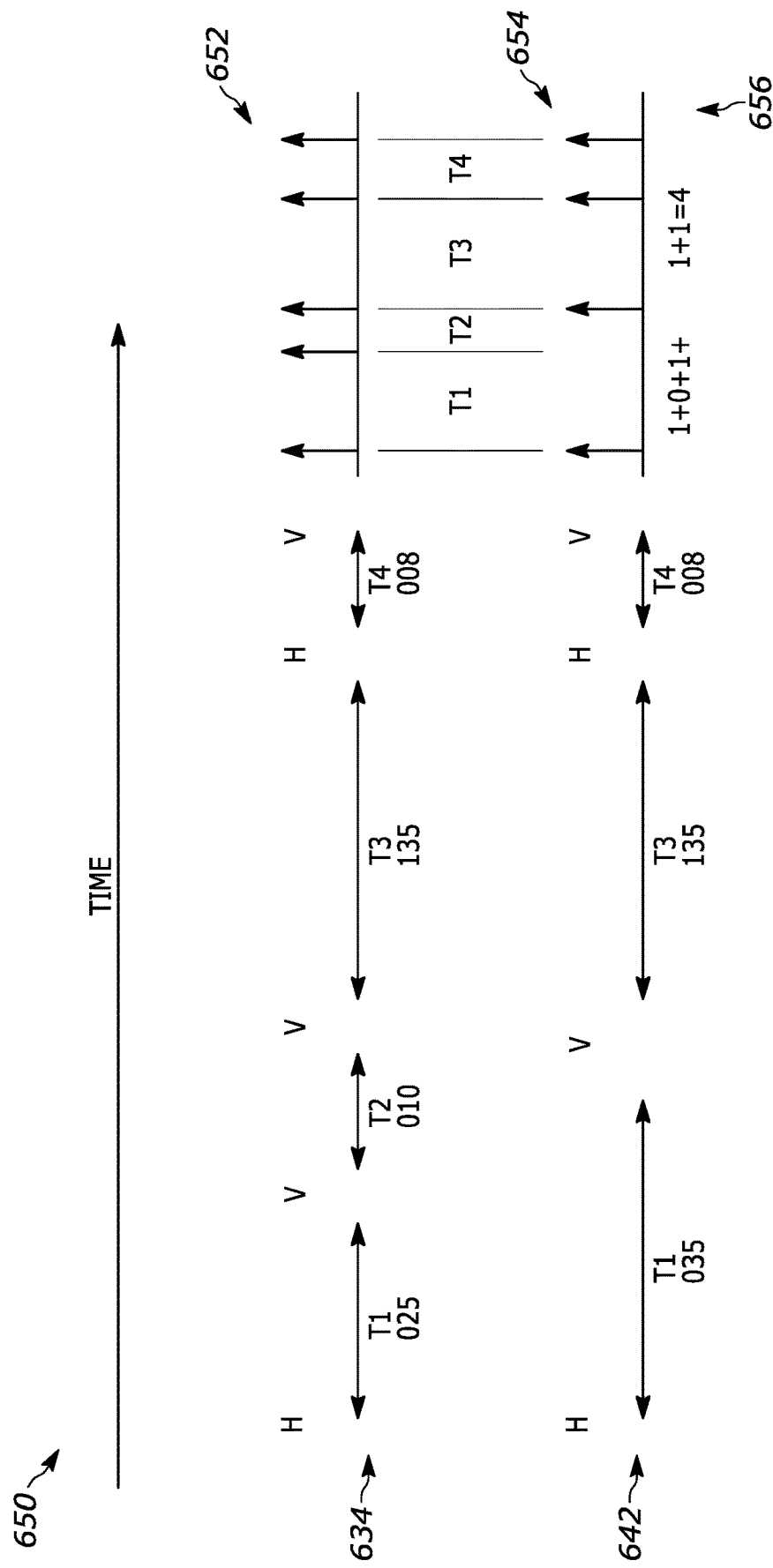
FIG. 6C illustrates an embodiment of correlating state combs of FIG. 6B.

It is possible to correlate these combs in various ways. For example, FIG. 6C illustrates an embodiment of correlating state combs of FIG. 6B. The combs 634, 642 may be converted into tiny time bins where the size of the bin is related to the accuracy of the clock measuring inter-tick arrivals. Thus comb 634 is represented as time diagram 652. Comb 642 is represented as time diagram 654. Then, the correlation is equivalent to the time bin method, with likely small (narrower window) time bins. The matched position in the example time diagrams 652, 6 FIG. 6C illustrates an embodiment of correlating state combs of FIG. 6B 54 yields a correlated value of four. In this case, only a few alignments with the single noise photon have a summed value of one.

Other matching methods can also be applied. The birth times of entangled photons are absolutely simultaneous, thus T1, T2, . . . Ti are very precisely defined. If an exact time interval match is found when comparing combs, and the local clock is very precise (ticks are short in duration), then it is likely that a single match of inter-photon arrival times defines the entire ensemble. If the first position doesn't work, a second random position or a third will likely yield a match. As the accuracy of your clock improves, the probability of a match of the ensemble, given a match of a single interval, improves as well. In general, it is possible to step through time values added to all events in one comb and compare the two combs at each of these values, most of which will not yield many matches until a value is found that has a large number of matching time stamps.

Numerous data processing algorithms can be used to process measured data to compensate for noise. Noise can be defined for some applications as the probability of an erroneous non-entangled photon detection. When determining a match based on a single interval, it is important to define the measurement interval for the appropriate level of noise. For example, if a noise photon (such as the errant V measurement described in connection with FIG. 6B) is measured between the reception of two entangled photons, it should be ignored when processing the data. When time matching, the algorithm employed can, for example, add together adjacent intervals when single interval matches are not seen (for example, the T1+T2 described in connection with FIG. 6C).

One feature of the present teaching is that the combs can be processed using a variety of methods to find matches between combs. As described herein, for example, a cross-correlation of time-binned data produces a peak at a match position, and the elements of either comb that occupy that match position are nominally all correlated states. The regular time bins provide a basis for the time comparison between the data in the two combs. For example, time bins provide the basis for k in the equation C(k) described earlier.

One feature of the present teaching is that certain information about timing at different nodes and/or different detectors that are sharing combs can be used to improve the efficiency of the matching process and/or algorithm. For example, having knowledge of an absolute time at D1 and D2 (that is, detector(s), D1 that receive one of a pair of entangled photons and D2 that receive the other one of the pair) can reduce the range over which two vectors need to look for a match. Various known methods and systems can be used to provide this absolute time information. For example, GPS can provide accurate absolute time at multiple locations with an accuracy on the order of forty nanoseconds. Various classical network clock synchronization schemes, for example, Building Integrated Timing Supply (BITS), where timing information is sent along a standard telecommunication connection, can also be used to obtain absolute time. Using an internet connection, for example, Network Time Protocol (NTP) is generally accurate to about 0.01 seconds. Other customized options can also be used. For example, a one nanosecond accuracy scheme known as White Rabbit is used in some time-sensitive physics infrastructure. A physical "wire" or other connection with known or trackable latency between D1 and D2 can be used. A common clock can be used at D1 and D2.

For separated nodes, having some knowledge about the relative time of flight to D1 and D2 from the pair-generation point can be useful. If the locations are fixed, location offset can be normalized out to zero. If the locations are moving, a location offset can be set to maximum movement allowed in the system. For example, a ranging system (RADAR) that detects within 20 miles, would have a maximum ten millisecond offset. It is possible to use delta encoding for this time of flight. For example, if an object is moving, it doesn't displace from location X1 to location X2 instantly, it has a velocity, so time between measurements can be accordingly constrained by velocity of the object.

In some embodiments, timestamps can be converted into time-binned vectors and then cross-correlated to find the match offset. In some embodiments, the binned timestamps result in a very large and/or very sparse vector if the stamp time resolution is very high. As such, in some embodiments, steps are taken to reduce the number of bits in the time stamp. For example, a 64-bit time stamp, at 125-ps resolution, has 8 billion ticks per second. Sixty-four bits can count to $18^{\wedge}19$ units, equivalent to seventy-four years. Thirty-two bits can count to 4 billion ticks, so looking at a second of timestamp data requires about thirty-three bits, while looking at 10 seconds of data requires about thirty-seven bits. As such, the timestamp needs less precision based on the knowledge about clocks and time-of-flight between detectors sharing combs.

In some embodiments, the precision of the timestamp is chosen to reduce a processing time (e.g. comb vector length) while maintaining a sufficient time resolution to find entangled correlations within a given background singles level. For example, for an entanglement generation rate of about ten pairs per second, a timestamp resolution of 125 picoseconds allows detection of entangled pairs with a low (<1%) error rate in a background of between 50K-100K counts per second. A timestamp resolution of one nanosecond allows detection of entangled pairs with a low (<1%) error rate in a background of between 5K-20K counts per second. A timestamp resolution of sixteen nanoseconds allows detection of entangled pairs with a low (<1%) error rate in a background of between 1K-4K counts per second. So, moving from 125 picosecond resolution timestamps to 1 ns resolution timestamps can take one to two off the above precision requirements. These optimizations can serve to reduce implementation costs depending on specific system requirements.

One feature of the present teaching is that algorithmic methods can be used for finding matches. Rather than translating time stamps into large sparse vectors of 0 and 1's (time-binning), it is possible to work directly with the time stamps. Various known methods can be used. For example, the simple brute force comparison search method can be used to look for matches. Additionally, a divide and conquer method that uses a progressive search, starting in the middle of the data series being compared and working by dividing by two each time can be used. This approach can reduce searches to on the order of n steps rather than an order of 2^n steps.

One feature of the specialized hardware can be used to improve the speed and efficiency of methods and systems of finding matches. For example, some embodiments, rather than a traditional Turing-machine search, utilize Content Addressable Memory (CAM) can be used. Some embodiments utilize specialized hardware that increments all stamps in a comb by one tick all at once and compares a large number of stamps to count matches in one cycle can be used. Some embodiments utilize state machines that are built using application specific circuits (ASICs). Some embodiments rely on known graphics and AI chips that include multiple processors to do functions that are equivalent to the batch increment and matching. For example, NVIDIA chips can be used that take advantage of the natural parallelism of the add and compare aspects of the computation.

Figure 7:
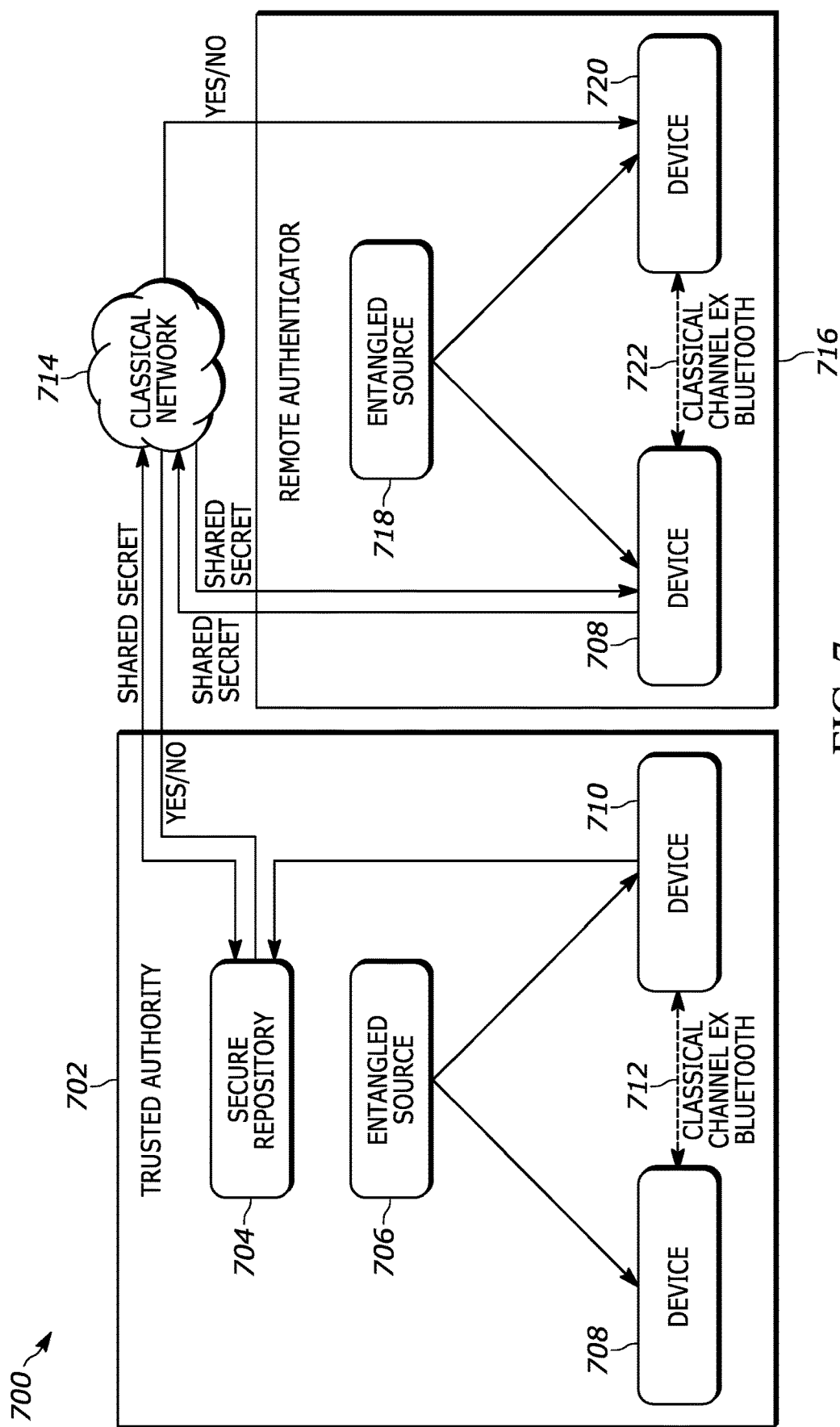
FIG. 7 illustrates an embodiment of an authentication and verification system and method using entangled photons with a trusted authority of the present teaching.

One feature of the authentication and verification method and system of present teaching is that it can be extended to include a trusted authority. FIG. 7 illustrates an embodiment of an authentication and verification system and method using entangled photons with a trusted authority of the present teaching. A trusted authority 702 includes a secure repository 704. An entangled source 706 produces pairs of photons, with one of the pair transported to a device 708 and the other of the pair transported to another device 710. These devices 708, 710 are similar to the devices 104, 106 described in connection with FIG. 1. The device 708 can be a handheld device or other personal device. And the other device 710 can be an authentication terminal or other point of sale device. The devices 708, 710 are connected by a classical channel 712 that could be a Bluetooth channel. The secure repository 704 is connected to a classical network 714 that connects remote locations. A remote authenticator 716 includes an entangled source 718. The entangled source 718 produces pairs of photons, with one of the pair transported to a device 708 and the other of the pair transported to another device 720. The device 708 and the other device 720 are connected by a classical channel 722 that could be a Bluetooth channel. The other device 720 in the remote authenticator 716 is connected to the classical network 714. The device 708 is connected to the classical network 714.

The authentication with trusted authority system 700 can work in multiple different ways, two of which will be described further. First, the party being authenticated can be assured that the authentication authority is the legitimate from a cold start as follows. A user with a device 708 goes to the trusted authority 702. The trusted authority 702 could reside in a bank or an ATM or other location. The trusted authority 702 identifies the user by some means. For example, they know the user, user biometrics, license, passport, bank account numbers, mother's maiden name or other means. The trusted authority 702 shares a random number via quantum means as discussed herein by connecting to the source 706. The random number is shared by the device 708 and the other device 710 and a portion of this random number is a verification code that is shared. The device 710 puts the code in a secure repository 704 with the identification information of the user. Only the user's device 708 and the authority's repository 704 know the verification code. In some embodiments, even the personnel at the trusted authority don't need to know the verification code. When the user wants to be identified, they go to a remote authenticator 716 and get a verification code that is created there by them connecting their device 708 (which for this use case is the same device 708 used in the trusted authority 702). In some embodiments the verification code, or part of the verification code, is used as a crypto key to encrypt information transfer at the remote authenticator 716. The user's device 708 then sends N-bits of the shared secret random number from the verification code generated on the earlier encounter with the trusted authority 702 over the classical network 714. This shared secret random number from the verification code is sent over the classic network 714, because it has no meaning to any observer than trusted authority 702. The trusted authority looks for a match with shared secret random number from the verification code in the secure repository 704. If there is a match, it must be the user, and a YES is sent to the device 720 at the remote authenticator 716. This, then, serves to authenticate the user in the system 700. As indicated herein, a user can be, for example, an individual, a sensor, a computing device, a robot, a machine, a drone and numerous other persons or devices that have an identity and/or a role in a system.

In some embodiments, the trusted authority 702 now sends to the user the next N-bits of the shared secret shared secret random number from the verification code via the classical network 714. Note that only trusted authority 702 and end user device 708 knows these bits. So, when the user receives the bits they know it must be from the trusted authority with which the initial encounter occurred.

In some embodiments, it is possible that in the remote authenticator 716 classical exchanges between the device 708 and other device 720 also perform additional sharing of combs to find error free bits. In some embodiments, it can be even more secure to send the noise bits too, and do the cross-correlation, or matching process, post-facto, at the authentication event in the remote authenticator 716. This way the transaction looks even more non-sensical, like noise, to an observer. The voracity of the trusted authority 702 depends on the handheld device 708 data and repository data 708 being kept secure by the user and trusted authority 702.

Referring to both FIGS. 1 and 7, in some embodiments, the device 106, 720 is a point-of-sale terminal. In some embodiments, the verification code is used to mark a purchase. In some embodiments, the verification code is used as a crypto key and verification of a credit card number in a point of sale transaction. In some embodiments, the verification code is used to provide access, and the authentication terminal 106, 720 is used to grant access. These are just examples of uses for the verification method using entangled photons of the present teaching.

EQUIVALENTS

While the Applicant's teaching is described in conjunction with various embodiments, it is not intended that the applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:
1. A method of transmitting verified data, the method comprising:
   a) measuring a time of arrival and a corresponding first or second state value of a plurality of first photons, wherein respective ones of the plurality of first photons are entangled with respective ones of a plurality of second photons in a first basis, which is time, and entangled in a second basis;
b) generating a first ordered list of the measured times of arrival of the plurality of first photons;
c) measuring a time of arrival and a corresponding first or second state value of the plurality of second photons;
d) generating a second ordered list of the measured times of arrival of the plurality of second photons;
e) determining time-of-arrival matches between the first ordered list and the second ordered list;
f) determining first or second state values that correspond to the determined time-of-arrival matches between the first ordered list and the second ordered list;
g) generating a verification code using at least some of the determined first or second state values that correspond to the determined time-of-arrival matches;
h) attaching the verification code to data as a unique identifier for the data;
i) transmitting the data with the verification code attached over a classical channel; and
j) verifying the data using the unique identifier.

2. The method of claim 1 wherein the transmitting the data with the verification code attached comprises transmitting to a trusted authority.

3. The method of claim 2 further comprising querying the trusted authority.

4. The method of claim 3 further comprising using a result of the query to make a conclusion on authenticating.

5. The method of claim 3 further comprising using the result of the query to authenticate a device.

6. The method of claim 1 further comprising performing a cryptographic operation with the verification code.

7. The method of claim 6 further comprising using the verification code as a cryptographic key.

8. The method of claim 1 wherein the plurality of first photons and the plurality of second photons are further entangled in a third basis.

9. The method of claim 8 further comprising measuring both a time of arrival and a corresponding state value of the third basis of the plurality of first photons and the plurality of second photons, and then determining errors in the verification code from the measured corresponding state values of the third basis.

10. The method of claim 8 further comprising measuring both a time of arrival and a corresponding state value of the third basis of the plurality of first photons and the plurality of second photons, and then producing additional bits in the verification code from the measured corresponding state values of the third basis.

11. The method of claim 1 further comprising subdividing the verification code into a plurality of verification codes and attaching the plurality of verification codes to respective portions of the data as respective unique identifiers for the data.

12. The method of claim 1 further comprising:
a) measuring a time of arrival and a corresponding first or second state value of a plurality of third photons, wherein respective ones of the plurality of third photons are entangled with respective ones of a plurality of fourth photons in a first basis, which is time, and entangled in a second basis;
b) generating a third ordered list of the measured time of arrival of the plurality of third photons;
c) measuring a time of arrival and a corresponding first or second state value of a plurality of fourth photons;
d) generating a fourth ordered list of the measured time of arrival of the plurality of fourth photons;
e) determining time-of-arrival matches between the third ordered list and the fourth ordered list;
f) determining first or second state values that correspond to the determined time-of-arrival matches between the third and fourth ordered lists;
g) generating a second verification code with at least some of the determined first and second state values that correspond to the time-of-arrival matches of the third and fourth ordered lists;
h) attaching the second verification code to data as a second unique identifier for the data; and
i) transmitting the data with the second verification code attached over the classical channel, wherein the transmitted data is verified with the second unique identifier.

13. The method of claim 12 wherein transmitting the data with the second verification code attached comprises transmitting to a trusted authority.

14. The method of claim 13 further comprising querying the trusted authority and using a result of the query to make a conclusion on authenticating.

15. The method of claim 12 further comprising performing a first cryptographic operation with the verification code and a second cryptographic operation with the second verification code.

16. The method of claim 15 further comprising using a result of both the first and the second cryptographic operation as a cryptographic key.

17. The method of claim 12 wherein the plurality of third photons and the plurality of fourth photons are further entangled in a third basis.

18. The method of claim 17 further comprising measuring both a time of arrival and a corresponding state value of the third basis of the plurality of third photons and the plurality of fourth photons, and then determining errors in the second verification code from the measured corresponding state values of the third basis.

19. The method of claim 17 further comprising measuring both a time of arrival and a corresponding state value of the third basis of the plurality of third photons and the plurality of fourth photons, and then producing additional bits in the verification code from the measured corresponding state values of the third basis.

20. The method of claim 12 further comprising subdividing the second verification code into a plurality of second verification codes and attaching the plurality of verification codes to respective portions of the data as respective unique identifiers for the data.

21. A receiver comprising:
a) a first device having input that receives a plurality of first photons and that is configured to measure both a time of arrival and a corresponding first or second state value of the plurality of first photons, and configured to generate at an output an ordered list of the measured times of arrival of the plurality of first photons;
b) a second device having input that receives a plurality of second photons, wherein respective ones of the plurality of first photons are entangled with respective ones of the plurality of second photons in a first basis, which is time, and entangled in a second basis, the second device being configured to measure both a time of arrival and a corresponding first or second state value of the plurality of second photons, and configured to generate at an output an ordered list of the measured times of arrival of the plurality of second photons; and
c) a processor connected to the output of the first device and the output of the second device and configured to receive the ordered list of the measured times of arrival of the plurality of first photons and the ordered list of the measured times of arrival of the plurality of second photons, the processor further configured to determine time-of-arrival matches between the ordered list of the measured times of arrival of the plurality of first photons and the ordered list of the measured times of arrival of the plurality of second photons, further configured to determine first or second state values that correspond to the time-of-arrival matches, and further configured to generate a verification code with at least some of the determined first or second state values that correspond to the time-of-arrival matches and further configured to attach the verification code to data as a unique identifier for the data.

22. The receiver of claim 21 wherein the processor is further configured to send the generated verification code to a trusted authority, to query the trusted authority, and to use a result of the query to authenticate.

23. The receiver of claim 21 wherein the processor is further configured to perform a cryptographic operation with the verification code.

24. The receiver of claim 21 further comprising a third device having an input that receives a plurality of third photons and an output that is connected to the processor.

25. A method of transmitting verified data, the method comprising:
  a) measuring a time of arrival and a corresponding first or second state value of a plurality of first photons and a plurality of second photons, where respective ones of the plurality of first photons are entangled with respective ones of a plurality of second photons in a first basis, which is time, and entangled in a second basis;
  b) generating a first and a second ordered list of the measured times of arrival of the plurality of respective first and second photons;
  c) determining time-of-arrival matches between the first ordered list and the second ordered list;
  d) determining first or second state values that correspond to the determined time-of-arrival matches between the first ordered list and the second ordered list;
  e) generating a verification code using some of the determined first or second state values that correspond to the determined time-of-arrival matches;
  f) attaching the verification code to data as a unique identifier for the data;
  g) transmitting the data with the verification code attached over a classical channel; and
  h) verifying the data using the unique identifier.

* * * * *